US011855977B2

(12) United States Patent
Mahajan et al.

(10) Patent No.: US 11,855,977 B2
(45) Date of Patent: Dec. 26, 2023

(54) SYSTEMS AND METHODS FOR CONFIGURING A NETWORK FUNCTION PROXY FOR SECURE COMMUNICATION

(71) Applicant: Verizon Patent and Licensing Inc., Basking Ridge, NJ (US)

(72) Inventors: Amit Mahajan, Bridgewater, NJ (US); Jayesh Kumar Laad, Ashland, MA (US); John M. Bittenbender, Bloomsburg, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/045,890

(22) Filed: Oct. 12, 2022

(65) Prior Publication Data

US 2023/0131703 A1 Apr. 27, 2023

Related U.S. Application Data

(63) Continuation of application No. 16/883,577, filed on May 26, 2020, now Pat. No. 11,489,825.

(51) Int. Cl.
| | |
|---|---|
| *H04L 29/06* | (2006.01) |
| *H04L 9/40* | (2022.01) |
| *H04L 47/70* | (2022.01) |
| *H04L 9/32* | (2006.01) |
| *H04L 67/56* | (2022.01) |

(52) U.S. Cl.
CPC ........ *H04L 63/0823* (2013.01); *H04L 9/3268* (2013.01); *H04L 47/82* (2013.01); *H04L 63/0281* (2013.01); *H04L 63/0869* (2013.01); *H04L 63/166* (2013.01); *H04L 67/56* (2022.05); *H04L 2209/76* (2013.01)

(58) Field of Classification Search
CPC .................................................. H04L 63/0823
See application file for complete search history.

(56) References Cited

U.S. PATENT DOCUMENTS

| | | | | |
|---|---|---|---|---|
| 2009/0113537 A1* | 4/2009 | Woo | ..................... | H04L 63/0884 726/12 |
| 2014/0095865 A1* | 4/2014 | Yerra | ..................... | H04L 9/3271 713/156 |
| 2015/0372994 A1* | 12/2015 | Stuntebeck | ........... | H04W 12/02 713/156 |
| 2017/0201381 A1* | 7/2017 | Kinder | ................ | H04L 63/0281 |

\* cited by examiner

*Primary Examiner* — Bradley W Holder

(57) ABSTRACT

A device may determine that a network function of a network is to use a secure communication protocol. The network function may be configured to facilitate communication via the network. The device may identify a component of a resource configuration that is to instantiate the network function. The device may instantiate, using the component, a proxy for the network function. The device may configure the proxy to obtain a certificate that is associated with the secure communication protocol. The device may cause the proxy to use the certificate to communicate with another proxy that is associated with the network function to perform an operation associated with the network function.

20 Claims, 16 Drawing Sheets

SYSTEMS AND METHODS FOR CONFIGURING A NETWORK FUNCTION PROXY FOR SECURE COMMUNICATION

RELATED APPLICATION

This application is a continuation of U.S. patent application Ser. No. 16/883,577, titled "SYSTEMS AND METHODS FOR CONFIGURING A NETWORK FUNCTION PROXY FOR SECURE COMMUNICATION," filed May 26, 2020, which is incorporated herein by reference in its entirety.

BACKGROUND

A public key infrastructure (PKI) is a set of hardware, software, policies, and procedures that provides a framework of encryption and data communication standards used to secure communications over a network.

DETAILED DESCRIPTION OF PREFERRED EMBODIMENTS

Figure 1A:
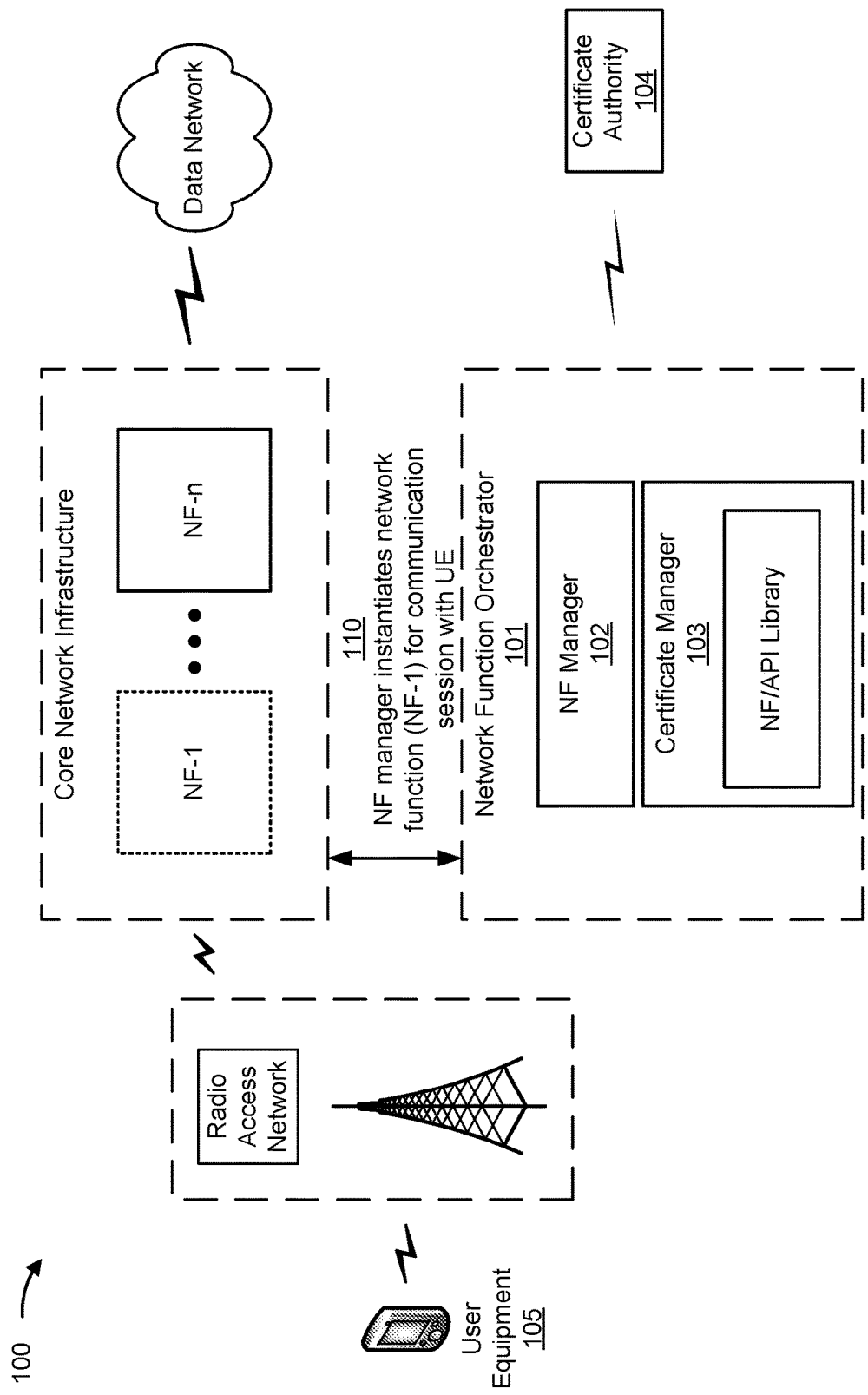
FIGS. 1A-1L are diagrams of one or more example implementations described herein.

The following detailed description of example implementations refers to the accompanying drawings. The same reference numbers in different drawings may identify the same or similar elements.

A network may include an entity (e.g., a device, an application, a virtual machine, a container, and/or the like) configured to perform a function and/or a service associated with the network. For example, an entity may be configured to perform a network function, such as a switching function, a routing function, a load balancing function, a firewall function, a gateway function, an intrusion detection function, and/or the like.

To provide security to ensure the integrity of data transmitted through the network, an entity may establish a trust relationship with another entity and data transmitted between the entities may be encrypted. The trust relationship may refer to a process that enables an entity to verify, with a certain degree of confidence, that data purporting to come from another entity (e.g., data including a source address associated with the other entity) was transmitted to the entity by the other entity. Encrypting the data transmitted between the entities may protect the data from being altered or changed prior to being received by a receiving one of the entities.

Commonly, an entity utilizes a public key infrastructure (PKI) to establish a trust relationship with another entity and/or to encrypt data transmitted between the entities. A PKI is a security architecture that enables the establishment of a trust relationship and/or the secure transfer of data in a network through a process that binds a public key with an identity of an entity.

The binding of the public key with the identity of an entity may be established through a process of registration and issuance of a certificate at, and by, a public certificate authority (CA). The public CA may act as a trusted third party that an entity may rely upon for verification of the identity of another entity.

For example, an entity implemented in a network may generate a private key and a public key for encrypting and decrypting data. The entity may generate a certificate signing request (CSR) for requesting a certificate from the public CA. The CSR may include information identifying the entity (e.g., information identifying a device associated with the entity (e.g., a MAC address, a serial number, and/or the like), information identifying an Internet service provider (ISP) associated with the entity and/or the network (e.g., a name of the ISP, a physical address associated with the ISP, an email address associated with the ISP, and/or the like), and/or the like), the public key, and/or the like.

The entity may transmit the CSR to a registration authority. The registration authority verifies and/or authenticates the identity of the entity based on the information included in the CSR and forwards the CSR to a public CA. The public CA provides the CSR to a certificate server that generates a certificate for the entity based on the public key. The certificate may include the public key and may be stored in a public database and/or transmitted to the entity.

The certificate, the public key, and/or the private key may enable the entity to establish a trust relationship with another entity. For example, data transmitted by the entity to the other entity may include a digital signature and/or the certificate. The entity may encrypt the digital signature using the private key. The other entity may query the public CA that issued the certificate to determine that the certificate is valid. The other entity may use the public key of the entity to decrypt the digital signature. The other entity may determine that the data was transmitted by the entity based on successfully decrypting the digital signature.

The data transmitted by the entity may be encrypted based on the public key associated with the other entity. For example, the entity may request the public key associated with the other entity from the other entity, obtain the public key associated with the other entity from the public database, and/or the like. The entity may utilize the public key associated with the other entity to encrypt the data. The other entity receives the encrypted data and utilizes the private key associated with the other entity to decrypt the data.

In various networks, a network function may be realized by a virtual machine or a container implemented on a physical device (e.g., a virtual network function). Utilizing virtual network functions may allow a structure of the network to be modified in response to current network conditions. For example, a new virtual network function can be added to the network to alleviate network congestion. However, the virtual network function may be configured to communicate utilizing a limited set of protocols. The set of protocols may not include a protocol utilized to communicate with a public CA thereby preventing the virtual network function from obtaining a certificate. Thus, a virtual network function may be configured to include a protocol for communicating with the public CA thereby increasing an amount of computing resources (e.g., processing resources, memory resources, communicating resources, and/or the like) required to implement the virtual network function relative to a virtual network function that does not include the protocol for communicating with the public CA.

Additionally, when the new virtual network function is configured to communicate with a public CA, an amount of time required to complete the process for obtaining a certificate for the new virtual network function may impede a network operator from effectively modifying the network to address current network conditions.

Further, obtaining the certificate for the new virtual network function from a public CA may create a security vulnerability associated with the network. For example, a malicious actor may be able to falsely obtain a certificate by impersonating as a virtual network function associated with a particular entity more easily relative to impersonating a network function implemented on a physical device (e.g., a physical network function).

The publication or storing of a certificate issued for the new virtual function may also create a security vulnerability for the network. For example, the certificate may include information identifying the virtual network function, information identifying a device on which the virtual network function is implemented, information identifying an entity associated with the network (e.g., an ISP), and/or the like. This information may be obtained and used by a malicious actor to determine a topology of the network and/or other information about the network that the malicious actor may use to attack the network. If the malicious actor attacks the network, computing resources (e.g., processor resources, memory resources, communication resources, and/or the like) may be utilized to identify the attack on the network, investigate suspicious activity associated with the attack, perform one or more actions to mitigate damage caused by the attack, and/or the like.

Some implementations described herein may implement a private public key infrastructure (e.g., a private PKI) that enables an entity included in a network to establish a trust relationship and/or to communicate encrypted data with another entity included in the network. The private PKI may be associated with a virtualization platform that includes a network function orchestrator. The network function orchestrator may instantiate a virtual network function (e.g., an entity) in the network and may instantiate a distributed proxy associated with the virtual network function.

The distributed proxy may generate a CSR for the virtual network function and may transmit the CSR to a private CA associated with the private PKI. Because the distributed proxy requests and obtains the certificate for the virtual network function, the virtual network function can be configured to include a limited set of protocols (e.g., a set of protocols that does not include a protocol used solely for communicating with a public CA). In this way, fewer computing resources may be utilized to implement the virtual network function relative to a corresponding virtual network function that obtains a certificate from a public CA.

The private CA may verify the identity of the virtual network function based on determining that the virtual network function has been instantiated in the network, receiving the CSR from the distributed proxy, and/or the like. In this way, the private CA may verify the identity of the virtual network function more quickly and based on less information relative to a public CA that verifies the identity of an entity based on information included in the CSR, such as information identifying the entity, information identifying an entity associated with the network (e.g., an ISP), and/or the like.

Further, by verifying the identity of the virtual network function based on determining that the virtual network function has been instantiated in the network, receiving the CSR from the distributed proxy, and/or the like, the private PKI may prevent a malicious actor from falsely obtaining a certificate by impersonating an identity of the virtual network function.

The private CA may store the certificate in a secure memory and may provide the certificate to the distributed proxy. Storing the certificate in a secure memory, rather than a public database associated with a public CA, may prevent a malicious actor from obtaining information identifying the virtual network function, information identifying a device on which the virtual network function is implemented, information identifying an entity associated with the network (e.g., an ISP), and/or the like that may be included in a certificate stored in a public database. In this way, the private CA may prevent the creation of a security risk associated with a malicious actor determining a topology of the network and/or other information about the network that the malicious actor may use to attack the network based on the information stored in the public database. By preventing the creation of the security risk, computing resources, that otherwise may have been utilized to identify the attack on the network, investigate suspicious activity associated with the attack, perform one or more actions to mitigate damage caused by the attack, and/or the like, may be conserved.

FIGS. 1A-1L are diagrams of an example implementation 100 described herein. As shown in FIGS. 1A-1L, a network function orchestrator 101 is associated with a core network infrastructure. The network function orchestrator 101 may manage network resources to ensure that computing resources, storage resources, and/or the like are available to provide a network service. As shown in FIG. 1A, the network function orchestrator 101 may include a network function manager 102 and a certificate manager 103.

The network function manager 102 may manage a lifecycle of network functions included in the core network infrastructure. For example, the network function manager 102 may instantiate a network function, may scale network functions included in the core network infrastructure, may update a network function, may upgrade a network function, may terminate a network function, and/or the like.

The certificate manager 103 may manage a lifecycle of certificates obtained from a certificate authority (CA) 104 for network functions and/or components of network functions included in the core network infrastructure. For example, the certificate manager 103 may obtain a certificate for a component of a newly instantiated network function, may validate a certificate based on a request from another component of the network function, may determine that a certificate is expired, may renew a certificate, may terminate a certificate, and/or the like.

In some implementations, the CA 104 may be co-located with the certificate manager 103. For example, the CA 104 may be a component of the network function orchestrator 101.

In some implementations, the certificate manager 103 may include the CA 104. For example, the core network infrastructure may comprise a containerized core network infrastructure that includes containerized network functions, such as a Kubernetes. The certificate manager 103 may comprise a citadel configured to perform the functions of the certificate manager 103 and the CA 104, as described herein.

Alternatively, and/or additionally, the certificate manager 103 may be a distributed signing authority that is issued a certificate by a CA and is authorized to issue certificates to network functions included in the core network infrastructure.

In some implementations, the network function manager 102 instantiates a network function to facilitate communication via the network. For example, the network may be a service provider network. A user equipment (UE) 105 may be associated with a customer of the service provider. The UE 105 may access the service provider network via a radio access network to access a service provided by the service provider and/or subscribed to by the customer.

The network function manager 102 may determine that a quantity of communication sessions associated with the network satisfies a threshold quantity of communication sessions. The network function manager 102 may determine to add additional resources to the network based on the quantity of communication sessions satisfying the threshold quantity of communication sessions. As shown in FIG. 1A, and by reference number 110, the network function manager 102 determines that a network function (e.g., NF-1, as shown in FIG. 1A) is to be instantiated for a communication session with the UE 105.

In some implementations, the network function NF-1 is a virtual network function. For example, the network function manager 102 may identify a physical device for hosting the virtual network function. The network function manager 102 may cause physical resources of the physical device to be allocated to the virtual network function. The network function manager 102 may deploy or instantiate the virtual network function based on allocating the physical resources.

In some implementations, the core network infrastructure is a containerized core network infrastructure and the network function NF-1 is a containerized network function. For example, the core network infrastructure may be a Kubernetes that groups containers associated with an application into a logical unit.

In some implementations, the network function includes a plurality of components. For example, the network function may include a set of one or more discrete components, pods, logical units, and/or the like that interoperate to perform one or more tasks of the network function. The network function manager 102 may determine a set of resources of the network (e.g., a set of hardware resources of a physical device included in the network) on which the components are to be instantiated. The network function manager 102 may instantiate the components to deploy the network function NF-1.

Figure 1B:
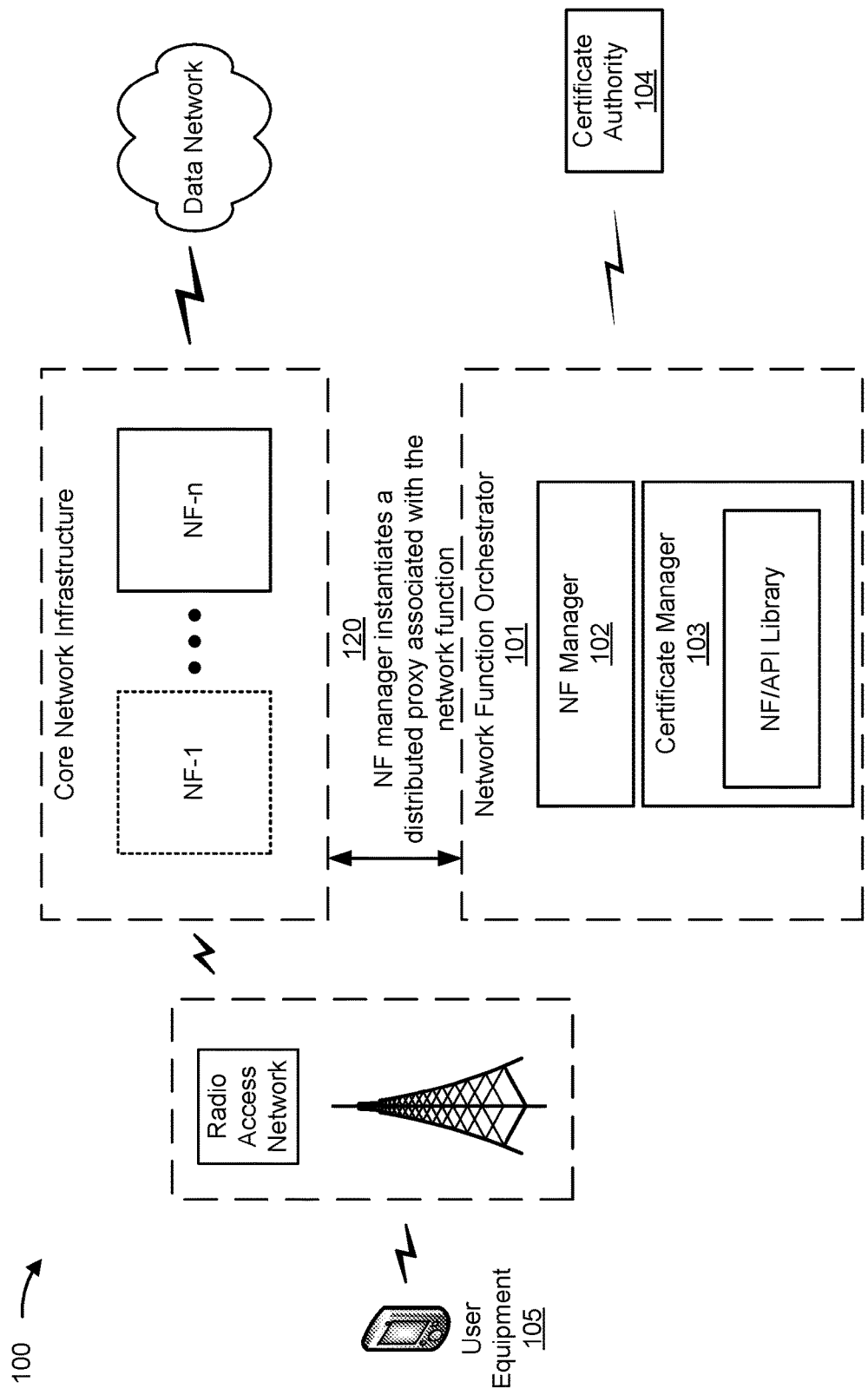

As shown in FIG. 1B, and by reference number 120, the network function manager 102 instantiates a distributed proxy associated with the network function NF-1. For example, the network function manager 102 may determine that the network function NF-1 is to utilize the private PKI for communications between components of the network function NF-1, for communications between the network function NF-1 and another network function, and/or the like. The network function manager 102 may instantiate the distributed proxy to enable the network function NF-1 to utilize the private PKI for the communications.

In some implementations, the distributed proxy may include a plurality of proxies. For example, the core network infrastructure may comprise a containerized core network infrastructure. The network function NF-1 may be comprised of a group of pods corresponding to components of the network function NF-1. A pod may correspond to a single instance of an application associated with the network function NF-1. The pod may encapsulate one or more containers that package code for the application along with the dependencies the application utilizes at run time and/or storage resources shared by the one or more containers. The group of pods may interoperate to provide a network function (e.g., a routing function, a switch function, and/or the like).

Figure 1C:
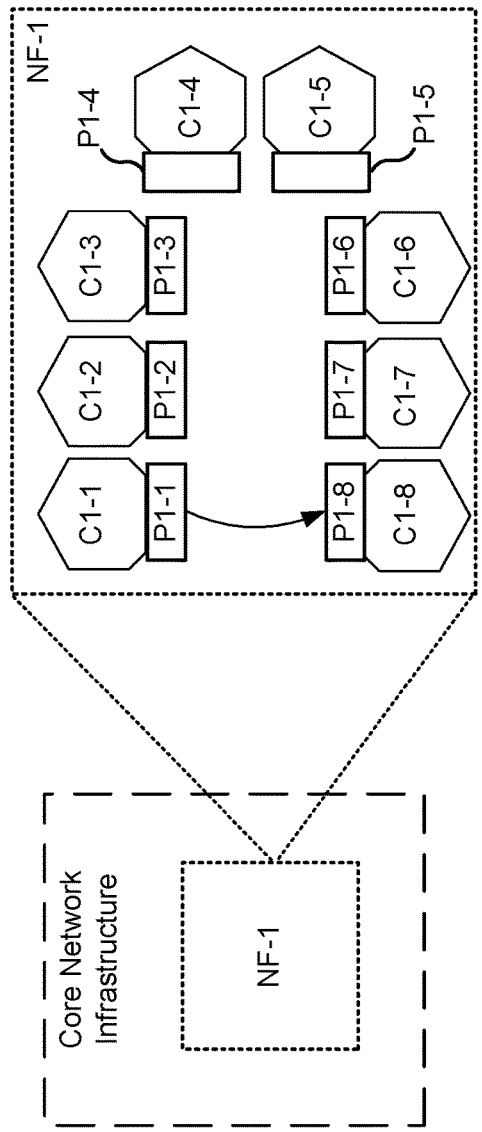

As shown in FIG. 1C, the network function NF-1 is comprised of eight pods (shown as C1-1 through C1-8). The network function manager may instantiate a distributed proxy that includes a respective proxy associated with each pod of the network function NF-1 (e.g., eight proxies (shown as P1-1 through P1-8)). The proxies may enable the pods to communicate with other pods of the network function NF-1 and/or another network function (e.g., another pod included in another network function).

For example, a proxy P1-1 may receive data from pod C1-1. The proxy P1-1 may determine that the data is to be transmitted to pod C1-8. The proxy P1-1 may transmit the data to pod C1-8 via proxy P1-8 based on a configuration of the proxy P1-1 and/or a set of network rules associated with proxy P1-1. For example, the set of network rules may cause the proxy P1-1 to utilize a certificate issued by CA 104 to transmit the data to proxy P1-8, as described below. Proxy P1-8 may receive the data and may provide the data to pod C1-8.

Figure 1D:
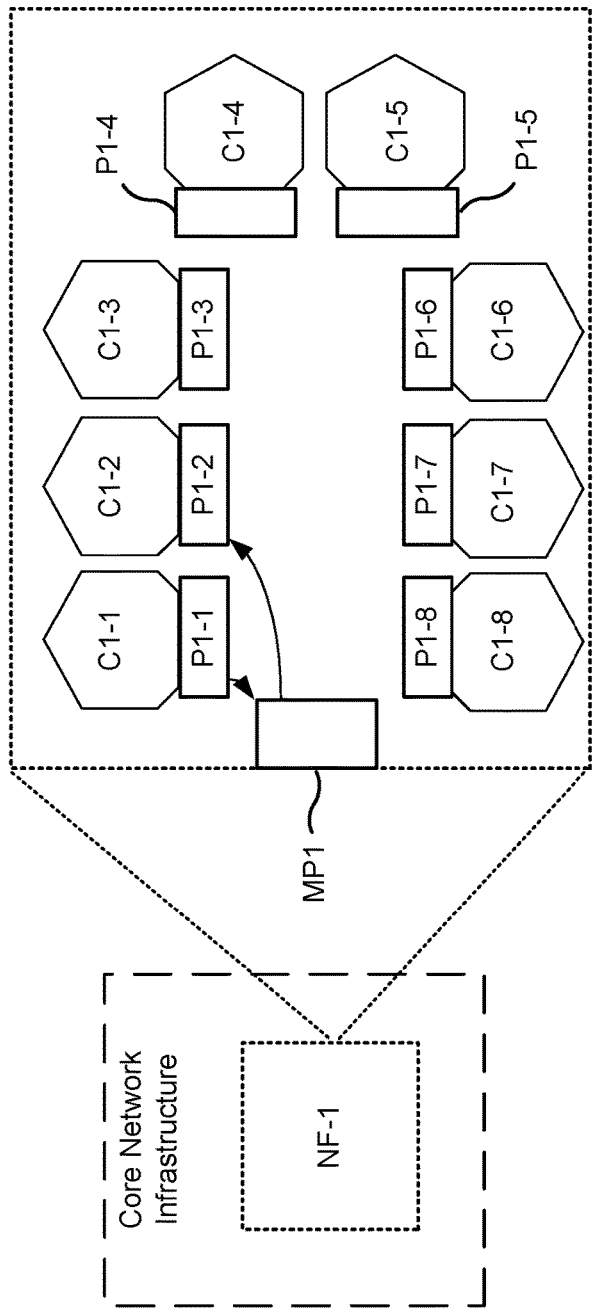

In some implementations, the plurality of proxies may include a master proxy. For example, as shown in FIG. 1D, the distributed proxy may include a respective proxy associated with each pod of the network function NF-1, as described above with respect to FIG. 1C. The distributed proxy may include a master proxy (shown as MP1 in FIG. 1D). The master proxy may enable the respective proxies associated with each pod to communicate with other proxies of the network function NF-1 and/or another network function (e.g., another proxy included in another network function).

For example, a proxy P1-1 may receive data from pod C1-1. The proxy P1-1 may determine that the data is to be transmitted to pod C1-2. The proxy P1-1 may transmit the data to the master proxy MP1 based on a configuration of the proxy P1-1 and/or a set of network rules associated with proxy P1-1. The master proxy MP1 may receive the data and may determine that the data is to be transmitted to pod C1-2. The master proxy MP1 may transmit the data to pod C1-2 via proxy P1-2 based on a configuration of the proxy MP1 and/or a set of network rules associated with the master proxy MP1. For example, the set of network rules may cause the master proxy MP1 to utilize a certificate issued by CA 104 to transmit the data to proxy P1-2, as described below. Proxy P1-2 may receive the data and may provide the data to pod C1-2.

In some implementations, the master proxy MP1 is a signing agent that is authorized to issue certificates to the plurality of proxies. For example, the certificate manager 103 may designate the master proxy as a signing agent. The master proxy MP1 may obtain a certificate from the certificate manager 103 and/or the CA 104, in a manner similar to that described below with respect to FIG. 1G. The master proxy MP1 may receive requests for certificates and/or issue certificates to the plurality of proxies based on the certificate obtained from the certificate manager 103 and/or the CA 104. In some implementations, the master proxy issues certificates in a manner similar to that described below with respect to FIG. 1G.

Figure 1E:
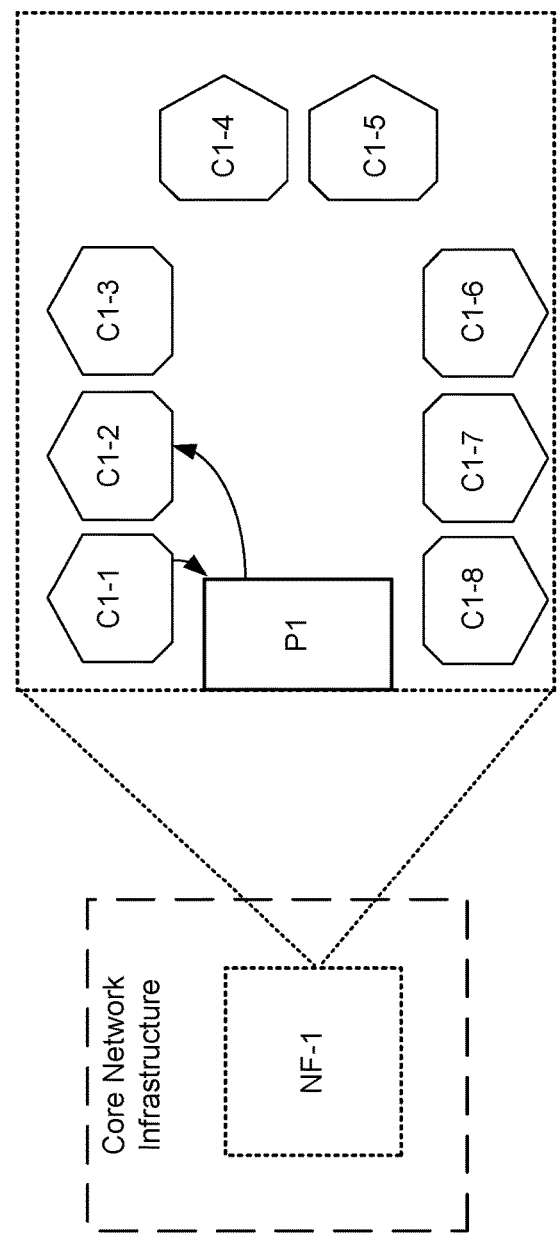

In some implementations, the distributed proxy includes a single proxy. For example, as shown in FIG. 1E, the distributed proxy includes a proxy P1 associated with the plurality of components (e.g., pods) of the network function NF-1. The proxy P1 may enable a pod of the network function NF-1 to communicate with other pods of the network function NF-1 and/or another network function (e.g., another pod included in another network function).

For example, the proxy P1 may receive data from pod C1-1. The proxy P1 may determine that the data is to be transmitted to pod C1-2. The proxy P1-1 may transmit the data to the pod C1-2 based on a configuration of the proxy P1 and/or a set of network rules associated with proxy P1. For example, the set of network rules may cause the proxy P1 to utilize a certificate issued by CA 104 to transmit the data to pod C1-2, as described below.

Figure 1F:
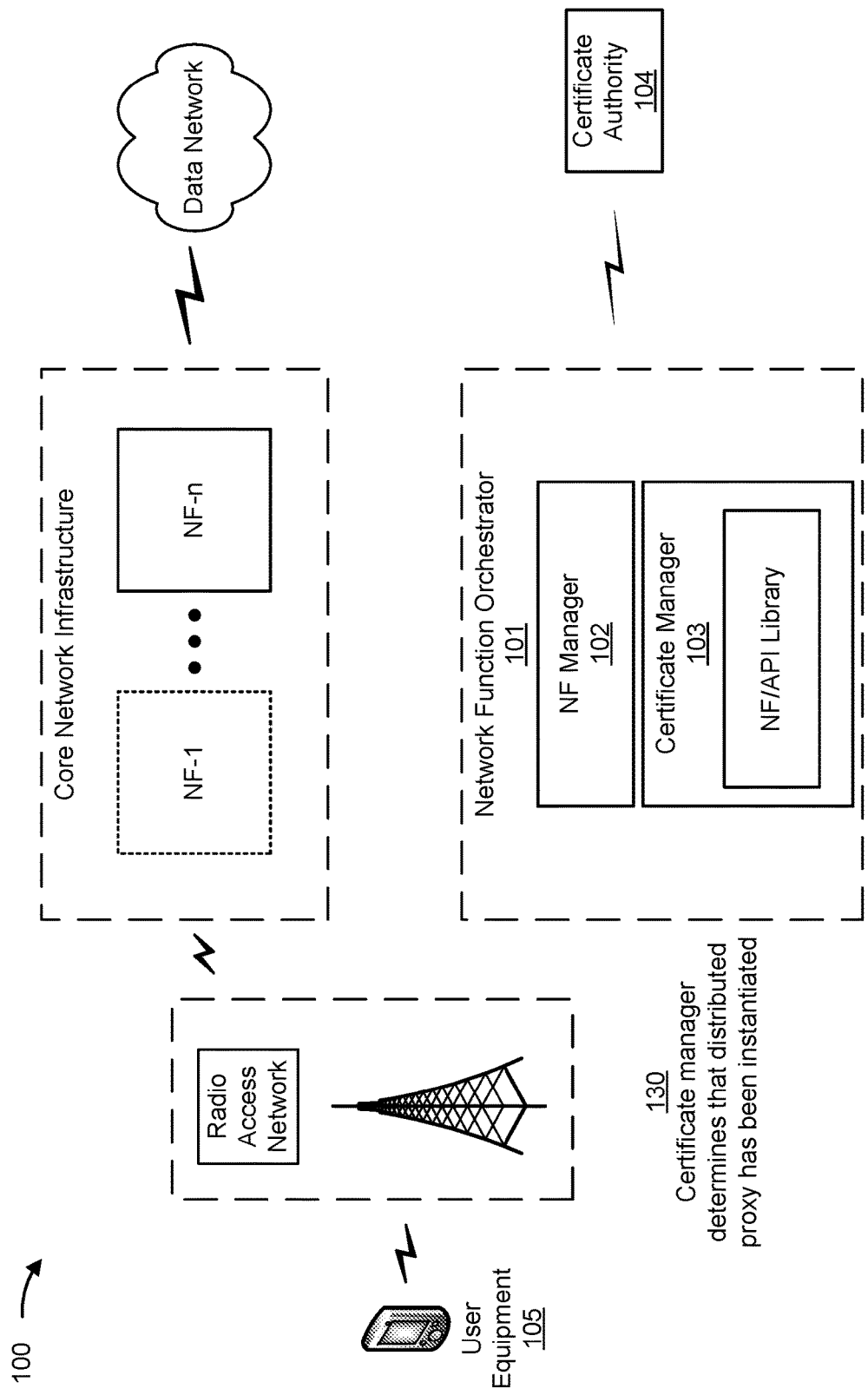

As shown in FIG. 1F, and by reference number 130, the certificate manager 103 determines that the distributed proxy has been instantiated. In some implementations, the certificate manager 103 may determine that the distributed proxy has been instantiated based on information provided by the network function orchestrator 101. For example, the network function manager 102 may provide a notification to the certificate manager 103 based on instantiating the distributed proxy. The notification may include an identifier associated with the network function NF-1, an identifier associated with the distributed proxy, information indicating a configuration of the distributed proxy (e.g., information indicating that the distributed proxy includes a respective proxy associated with each component of the network function NF-1, information indicating that the distributed proxy includes a master proxy and a respective proxy associated with each component of the network function NF-1, and/or information indicating that the distributed proxy includes a single proxy, and/or the like). The notification may also include an identifier associated with a component of the network function NF-1, an identifier associated with the network function NF-1, information indicating that the distributed proxy has been instantiated, information identifying an IP address associated with the distributed proxy, and/or information identifying an IP address associated with a component of the network function NF-1. Alternatively and/or additionally, the notification may include information identifying an IP address associated with the network function NF-1, information identifying a host associated with the distributed proxy (e.g., a host name, an identifier, and/or another type of information identifying a physical device on which the distributed proxy, a component of the network function NF-1, and/or the network function NF-1 has been instantiated or deployed), and/or the like.

Alternatively, and/or additionally, the certificate manager 103 may determine that the distributed proxy has been instantiated based on information provided by the distributed proxy. For example, the distributed proxy may generate a request for a certificate. The request may include information identifying an IP address associated with the distributed proxy, information identifying a host associated with the distributed proxy, and/or the like.

In some implementations, the request includes a public key. For example, the distributed proxy may generate and/or obtain a key pair that includes a public key and a private key associated with the distributed proxy. The distributed proxy may include information identifying the public key in the request.

The distributed proxy may transmit the request to the certificate manager 103. The certificate manager 103 may determine that the distributed proxy has been instantiated based on receiving the request.

The certificate manager 103 may determine to obtain a certificate for the distributed proxy based on the distributed proxy being instantiated. For example, the certificate manager 103 may determine an identifier associated with a component of the network function NF-1 associated with the distributed proxy based on the notification. The certificate manager 103 may determine a type of the component of the network function NF-1, an operation to be performed by the component of the network function NF-1, a communication protocol associated with the component of the network function NF-1, and/or the like based on the identifier. For example, the certificate manager 103 may access a data structure (e.g., a database, a list, and/or the like) stored in a memory associated with the certificate manager 103. The data structure may store information associating identifiers with types of components of network functions, information associating types of components of network functions with operations performed by the types of components of network functions, communication protocols associated with the types of components of network functions, application program interfaces associated with the types of components of network functions, and/or the like.

The certificate manager 103 may determine to obtain a certificate for the distributed proxy based on the type of component of the network function NF-1, the operation to be performed by the component of the network function NF-1, the communication protocol associated with the component of the network function NF-1, and/or the like. For example, the certificate manager 103 may determine that the component of the network function NF-1 is to utilize a certificate to communicate with one or more other components of the network function NF-1 and/or one or more components of other network functions included in the core network infrastructure based on the component of the network function NF-1 being a particular type of component of the network function, based on the component of the network function NF-1 being configured to perform a particular operation, and/or the like.

Alternatively, and/or additionally, the certificate manager 103 may determine that a communication protocol associated with the component of the network function NF-1 is not a communication protocol for communicating with the CA 104. The certificate manager 103 may determine to obtain the certificate for the distributed proxy (e.g., rather than for the component of the network function NF-1) based on the communication protocol associated with the component of the network function NF-1 not being a communication protocol for communicating with the CA 104.

In some implementations, the certificate manager 103 may determine to obtain a certificate for the distributed proxy based on a set of network rules for communicating within the network. For example, the network function FN-1 may be a containerized network function that includes a group of one or more pods for performing one or more tasks associated with the network function NF-1. The distributed proxy may implement a set of network rules for a group of pods. The set of network rules may cause a pod, of the group of pods, to communicate with another pod of the group of pods and/or with a pod included in another containerized network function via the distributed proxy. The certificate manager 103 may determine the set of network rules associated with the distributed proxy and may determine to obtain a certificate for the distributed proxy based on the set of network rules.

Figure 1G:
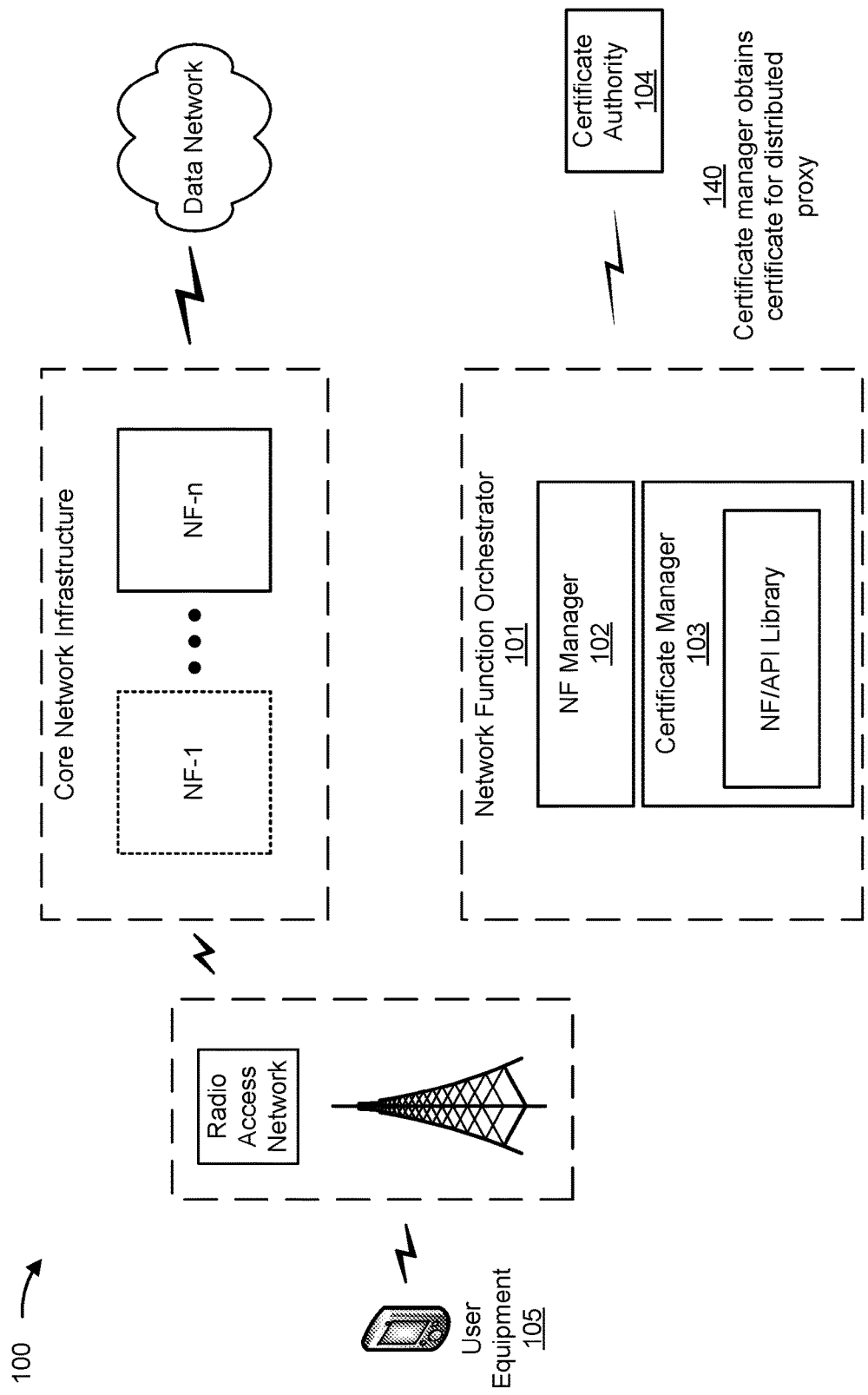

As shown in FIG. 1G, and by reference number 140, the certificate manager 103 obtains a certificate for the distributed proxy. For example, the certificate manager 103 may generate and/or transmit a request for a certificate to the CA 104 to obtain a certificate for the distributed proxy. The request may include information identifying a component of the network function NF-1, information identifying the distributed proxy, information identifying a proxy included in the distributed proxy, a public key, information identifying the certificate manager 103, information identifying an application program interface associated with the distributed proxy, information identifying a communication protocol associated with the distributed proxy, and/or the like. The items listed above as being included in the request are intended as examples of items that may be included in the request. In practice, the request may include any single one of these items, any combination of these items, and/or one or more other items not listed above.

In some implementations, a public key generated by the distributed proxy is included in the request. In some implementations, a public key generated by the certificate manager 103 is included in the request. For example, the certificate manager 103 may generate a key pair that includes a private key and a public key based on determining that the distributed proxy is instantiated, based on determining to obtain the certificate for the distributed proxy, and/or the like.

In some implementations, the request does not include a public key. For example, the CA 104 may generate the public key and/or the private key, the distributed proxy may utilize another form of encryption to transmit data, and/or the like.

In some implementations, the certificate manager 103 may generate and/or transmit a single request for a certificate associated with the network function NF-1. For example, the certificate manager 103 may generate and/or transmit the single request in situations where the distributed proxy includes a single proxy, as described above with respect to FIG. 1E, or a master proxy, as described above with respect to FIG. 1D. The certificate manager 103 may generate and/or transmit a request for a certificate to CA 104 to obtain a single certificate (or multiple certificates having a same certificate identifier) associated with the network function NF-1 based on the distributed proxy including a single proxy or a master proxy.

In some implementations, the certificate manager 103 may generate and/or transmit a one or more requests to CA 104 to obtain multiple certificates associated with the network function NF-1. For example, the certificate manager 103 may generate and/or transmit the one or more requests in situations where the distributed proxy includes a plurality of proxies corresponding to components of the network function NF-1, as described above with respect to FIG. 1C. The certificate manager 103 may generate and/or transmit one or more requests for certificates to the CA 104 to obtain certificates for the plurality of proxies.

The CA 104 may receive the request(s) and may verify an identity of the network function NF-1, a component of the network function NF-1, and/or the distributed proxy. For example, the CA 104 may determine that the network function NF-1, the component of the network function NF-1, the distributed proxy, and/or the certificate manager 103 are included in a network associated with a service provider associated with the CA 104. In some implementations, the CA 104, the network function NF-1, the component of the network function NF-1, the distributed proxy, and/or the certificate manager 103 may be associated with a same host platform. The CA 104 may determine that the network function NF-1, the component of the network function NF-1, the distributed proxy, and/or the certificate manager 103 are included in the network associated with the service provider based on the CA 104, the network function NF-1, the component of the network function NF-1, the distributed proxy, and/or the certificate manager 103 being associated with the same host platform.

The CA 104 may verify the identity of the network function NF-1, the component of the network function NF-1, and/or the distributed proxy based on the network function NF-1, the component of the network function NF-1, the distributed proxy, and/or the certificate manager 103 being included in the network associated with the service provider. In this way, the CA 104 may quickly and efficiently verify the identity of the network function NF-1, the component of the network function NF-1, and/or the distributed proxy.

The CA 104 may generate one or more certificates associated with the network function NF-1 based on verifying the identity of the network function NF-1, the component of the network function NF-1, and/or the distributed proxy. In some implementations, the CA 104 may generate a single certificate associated with the network function. For example, the CA 104 may receive a request that includes information indicating that the distributed proxy includes a master proxy, that the distributed proxy includes a single proxy, that the distributed proxy is to utilize a single certificate, and/or the like. The CA 104 may generate a single certificate associated with the network function based on the information included in the request.

In some implementations, the CA 104 may generate a plurality of certificates associated with the network function NF-1. For example, the CA 104 may receive one or more requests that include information indicating that the distributed proxy includes a plurality of proxies corresponding to components of the network function NF-1, the CA 104 may use information in the one or more requests to obtain certificates for the respective proxies from the certificate manager 103, and/or the like. The CA 104 may generate the plurality of certificates associated with the network function NF-1 based on the information included in the one or more requests and/or based on receiving multiple requests for certificates from the certificate manager 103.

In some implementations, the CA 104 generates a plurality of unique certificates (e.g., a plurality of certificates having different certificate IDs, including different public keys, and/or the like). For example, the CA 104 may receive a request that includes information indicating that each respective proxy is to utilize a unique certificate to communicate with the network. The CA 104 may generate the plurality of unique certificates based on the information included in the request.

In some implementations, the CA 104 may generate the certificate based on an available key configuration and/or a certification protocol associated with the CA 104. For example, the CA 104 may receive a request that includes information identifying the distributed proxy associated with the network function NF-1, information identifying a respective proxy of the distributed proxy, information identifying a communication protocol associated with the network function NF-1, information identifying a type of network function associated with the network function NF-1, and/or the like. The CA 104 may determine a certification protocol based on the information included in the request. The CA 104 may determine that the certification protocol is associated with a key (e.g., a private key, a public key, and/or the like) and/or a particular key configuration. The CA 104 may identify, from a key data structure stored in a memory associated with the CA 104, an available key configuration for the certificate based on the certification protocol being associated with the key and/or the particular key configuration. The CA 104 may generate the certificate based on the available key configuration and based on the certification protocol.

The certificate may include information identifying the CA 104, information identifying the network function NF-1, information identifying the distributed proxy, information identifying a component of the network function NF-1, information identifying a respective proxy of the distributed proxy, the public key, information identifying an application interface associated with the distributed proxy, information identifying a communication protocol associated with the CA 104 (e.g., certificate management protocol, version 2 (CMPv2), simple certificate enrollment protocol (SCEP), enrollment over secure transport (EST), and/or the like), and/or the like. The items listed above as being included in the certificate are intended as examples of items that may be included in the certificate. In practice, the certificate may include any single one of these items, any combination of these items, and/or one or more other items not listed above. The CA 104 may store the certificate in a data structure stored in a memory of the CA 104 and/or may transmit the certificate to the certificate manager 103.

Figure 1H:
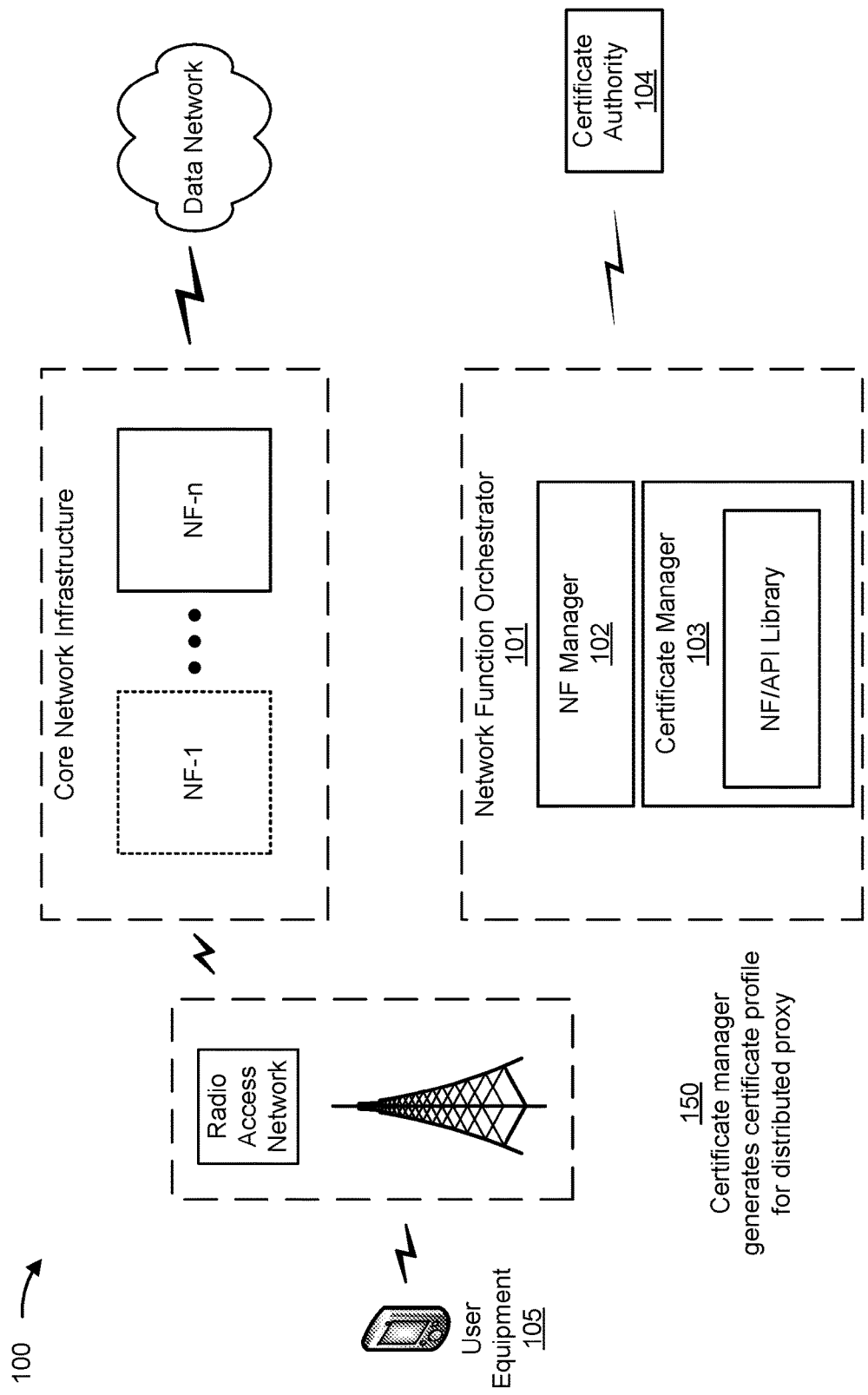

The certificate manager 103 may receive the certificate from the CA 104 and may store the certificate in a memory (e.g., secure storage) associated with the certificate manager 103. As shown in FIG. 1H, and by reference number 150, the certificate manager 103 generates a certificate profile for the distributed proxy. The certificate profile may include the certificate, the private key (e.g., when the key pair including the private key and the public key is generated by the certificate manager 103 and/or the CA 104), information identifying the certification protocol associated with the CA 104, information identifying the certificate authority (e.g., CA 104), information identifying the application program interface associated with the distributed proxy, information identifying the certificate manager 103, information identifying an IP address associated with the distributed proxy, and/or the like. The items listed above as being included in the certificate profile are intended as examples of items that may be included in the certificate profile. In practice, the certificate profile may include any single one of these items, any combination of these items, and/or one or more other items not listed above.

In some implementations, the certificate manager 103 may generate a plurality of certificate profiles associated with the distributed proxy. For example, the distributed proxy may include a plurality of proxies (e.g., a respective proxy for each of a plurality of components of the network function NF-1). The certificate manager 103 may obtain a certificate for each proxy of the plurality of proxies. The certificate manager 103 may generate a certificate profile for each proxy and may transmit a certificate profile to a proxy, of the plurality of proxies, for which the certificate profile was generated.

Figure 1I:
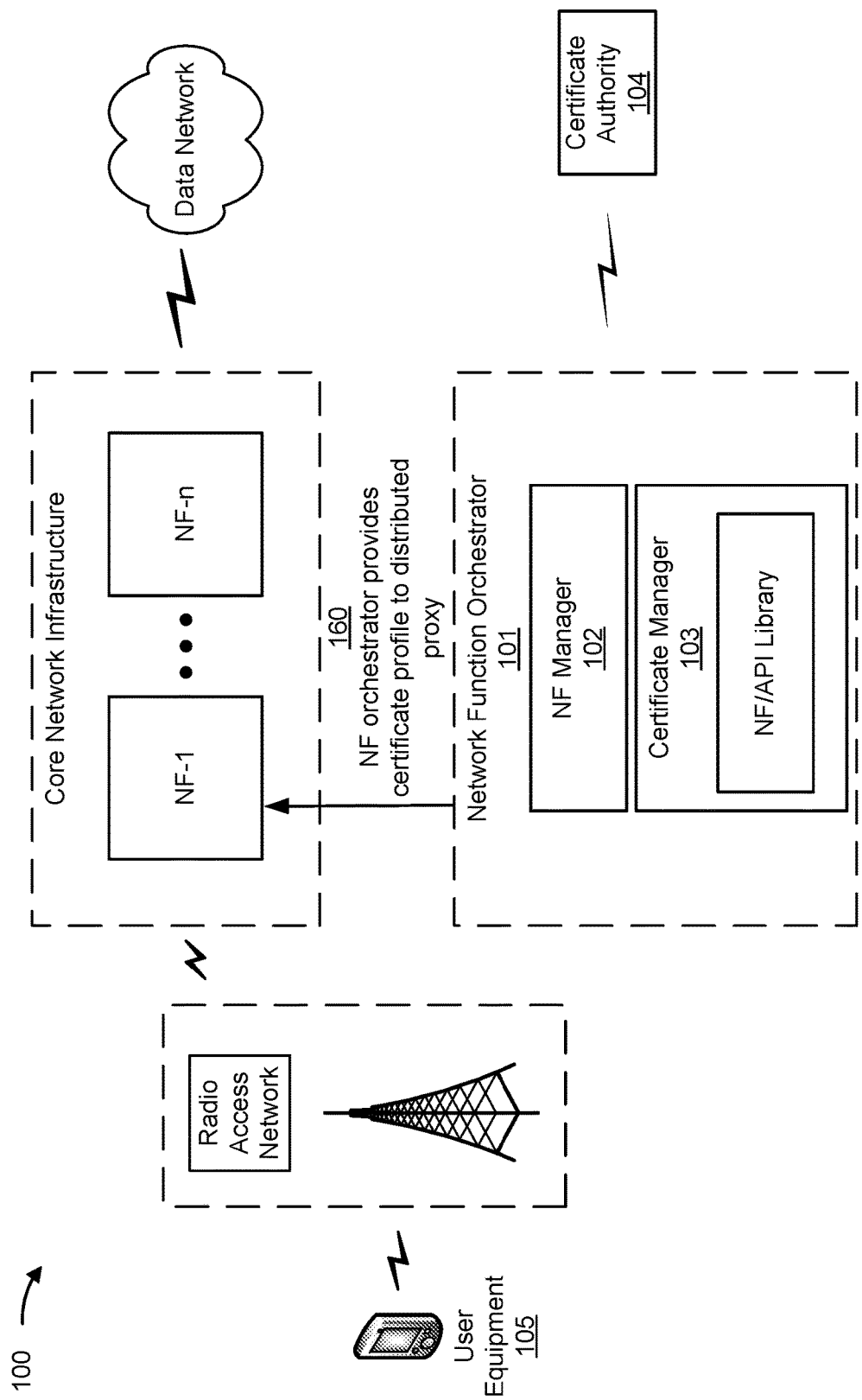

As shown in FIG. 1I, and by reference number 160, the network function orchestrator 101 provides the certificate profile to the distributed proxy. For example, the certificate manager 103 may transmit the certificate profile to the distributed proxy to enable a component of the network function NF-1 to communicate in a secure manner (e.g., via encrypted data, via a secure communication session, and/or the like) with other components of the network function NF-1 and/or with other network functions included in the core network infrastructure.

Figure 1J:
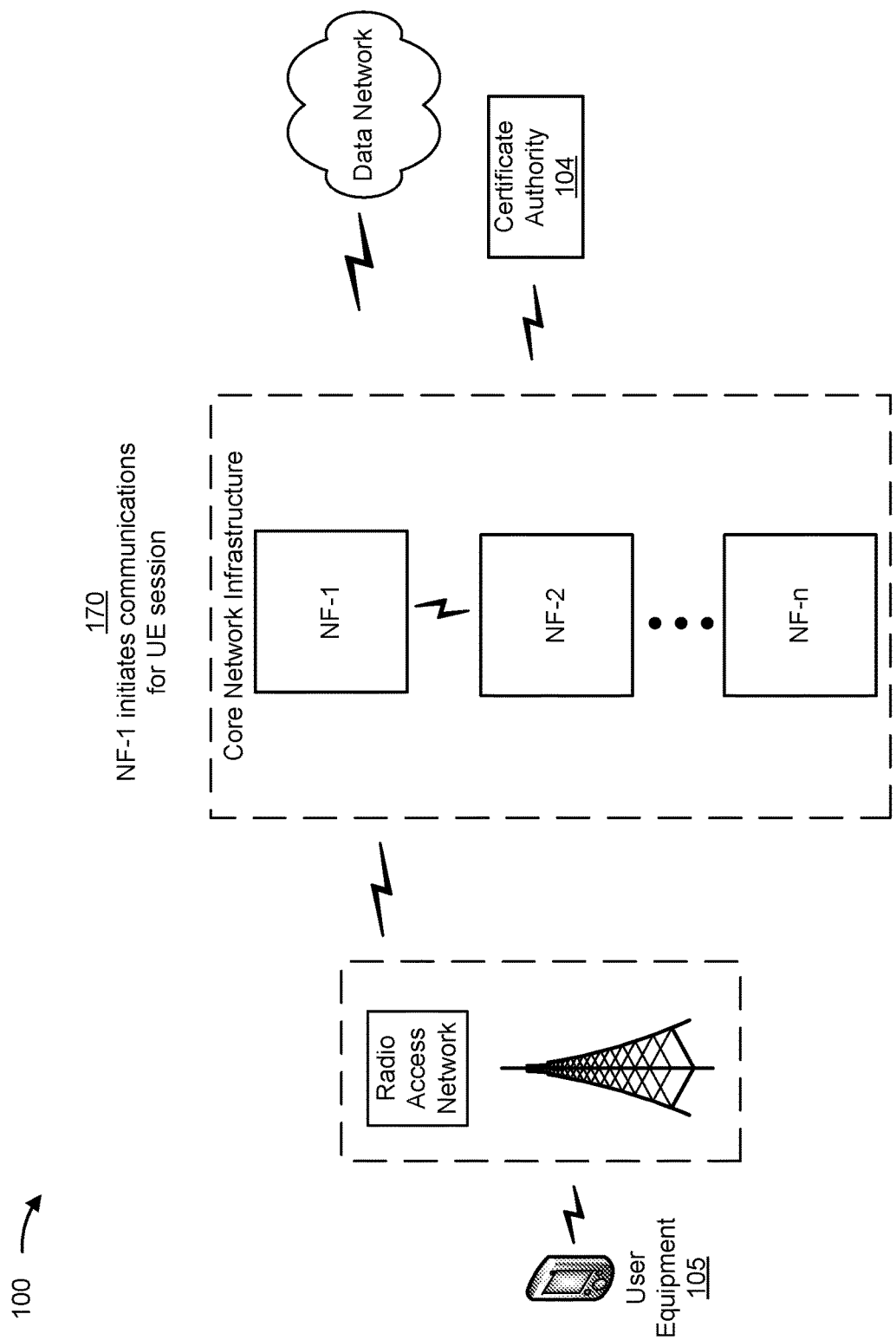

As shown in FIG. 1J, and by reference number 170, the network function NF-1 initiates communications for a UE session. In some implementations, the network function NF-1 initiates communications with another network function (e.g., NF-2 as shown in FIG. 1J). For example, the network function NF-1 may determine to establish a communication session with the network function NF-2 to allow the UE 105 to access a service provided by the network. The network function NF-1 may utilize the distributed proxy to generate the request and/or to transmit the request to the network function NF-2.

Figure 1K:
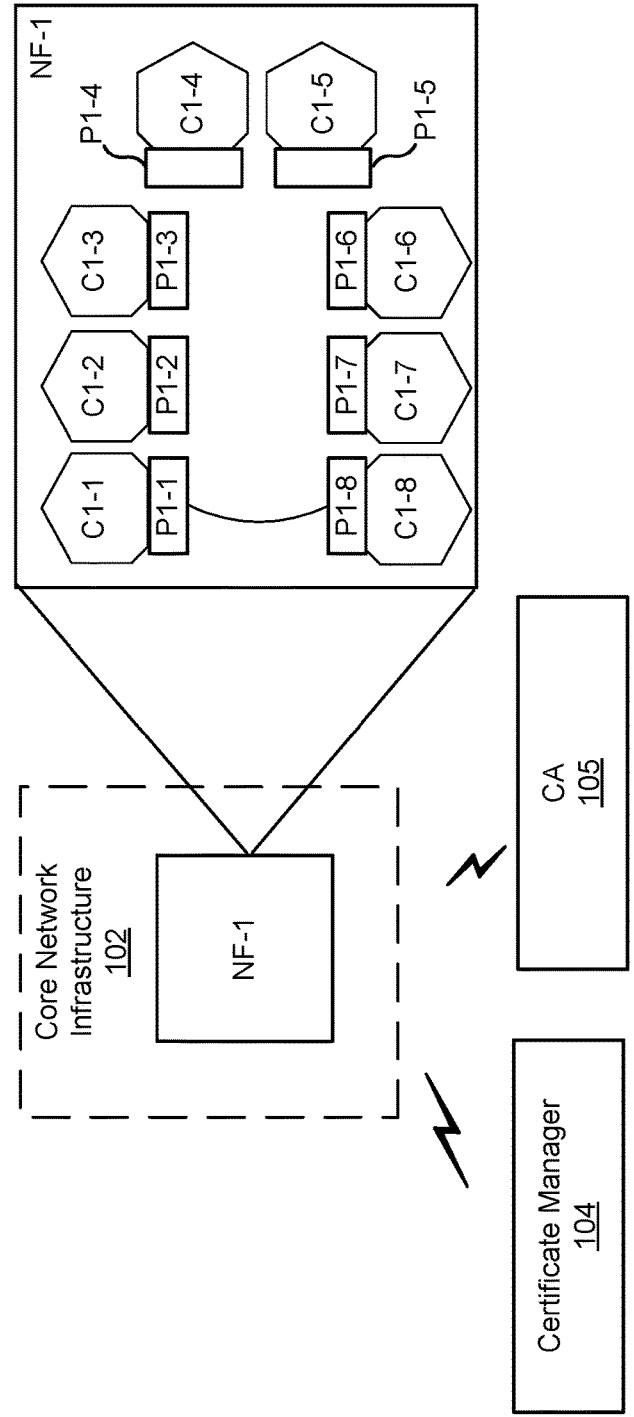

For example, as shown in FIG. 1K, the network function NF-1 may include a plurality of components (shown as C1-1 through C1-8). Each component may be associated with a respective proxy of the distributed proxy (shown as P1-1 through P1-8). A first component of the network function NF-1 (shown as C1-1) may generate data associated with the request to establish the communication session with the network function NF-2. The component C1-1 may transmit the data to proxy P1-1. The proxy P1-1 may determine that the data is to be transmitted to component C1-8. The proxy P1-1 may transmit a notification to proxy P1-8 indicating that the proxy P1-1 is to transmit the data to component C1-8 via the proxy P1-8. The notification may include the certificate included in the certificate profile, a digital signature associated with the proxy P1-1, and/or the like.

The proxy P1-8 may receive the notification and may verify the identity of the proxy P1-1 (e.g., verify that the notification was transmitted by the proxy P1-1) and/or authenticate the proxy P1-1 based on the certificate. As shown in FIG. 1K, and by reference number 180, the proxy P1-8 verifies the identity of the proxy P1-1 to enable communication with the proxy P1-1. For example, the proxy P1-8 may transmit a request for the public key associated with the proxy P1-1 to the certificate manager 104 or the CA 104. The request may include information identifying the certificate issued to the proxy P1-1, information identifying the proxy P1-1, and/or the like. For the description to follow, assume that the proxy P1-8 transmits the request to the CA 104.

The CA 104 may receive the request and may determine whether the certificate issued for the proxy P1-1 has been revoked based on a certificate revocation list (CRL) stored in a memory of the CA 104. The CRL may store information identifying certificates that have been revoked. The CA 104 may determine that the CRL does not include information identifying the certificate issued to the proxy P1-1. The CA 104 may determine that the certificate is valid (e.g., active, not revoked, and/or the like) based on the CRL not including information identifying the certificate. The CA 104 may obtain the public key associated with the proxy P1-1 and may transmit the public key and/or information indicating that the certificate is valid to the proxy P1-8 based on the certificate being valid.

The proxy P1-8 may verify the identity of the proxy P1-1 based on the public key and/or the information indicating that the certificate is valid. The proxy P1-1 may encrypt the digital signature included in the request transmitted to the proxy P1-8 based on the private key associated with the proxy P1-1. The proxy P1-8 may decrypt the digital signature based on the public key associated with the proxy P1-1. The proxy P1-8 may verify the identity of the proxy P1-1 based on decrypting the digital signature based on the public key associated with the proxy P1-1.

In some implementations, the proxy P1-8 transmits a response to the proxy P1-1 based on verifying the identity of the proxy P1-1. The response may include information indicating that the proxy P1-8 verified the identity of the proxy P1-1 and/or a certificate issued to the proxy P1-8. The proxy P1-1 may receive the response and may verify the identity of the proxy P1-8 based on the certificate included in the response. In some implementations, the proxy P1-1 verifies the identity of the proxy P1-8 in a manner similar to that described above with respect to FIG. 1K.

The proxy P1-1 may encrypt the data utilizing the public key associated with the proxy P1-8 and may transmit the encrypted data to the proxy P1-8 based on verifying the identity of the proxy P1-8. The proxy P1-8 may receive the encrypted data and may utilize the private key associated with the proxy P1-8 to decrypt the encrypted data. The proxy P1-8 may provide the decrypted data to the component C1-8. The component C1-8 may utilize the decrypted data to establish the communication session with the network function NF-2.

For example, the component C1-8 may generate a request to establish the communication session with the network function NF-2 based on the decrypted data. The component C1-8 may provide the request to the proxy P1-8. The proxy P1-8 may transmit the request and information associated with a certificate issued to the proxy P1-8 to the network function NF-2 (e.g., a distributed proxy associated with the network function NF-2). The information associated with the certificate issued to the proxy P1-8 may include the certificate, a digital signature associated with the proxy P1-8, and/or the like.

The network function NF-2 may receive the request and the information associated with the certificate issued to the proxy P1-8 and may verify the identity of the proxy P1-8 (e.g., verify that the request was transmitted by the proxy P1-8) and/or authenticate the proxy P1-8 based on the certificate. In some implementations, the network function NF-2 verifies the identity of the proxy P1-8 and/or authenticates the proxy P1-8 in a manner similar to that described above with respect to FIG. 1K. The network function NF-2 verifies the identity of the proxy P1-8 to enable communication with the network function NF-1 for the communication session with the UE 105.

In some implementations, the network function NF-2 transmits a response to the proxy P1-8 based on verifying the identity of the proxy P1-8. The response may include information indicating that the network function NF-2 verified the identity of the proxy P1-8 and/or a certificate issued to the network function NF-2. The proxy P1-8 may receive the response and may verify the identity of the network function NF-2 based on the certificate included in the response. In some implementations, the proxy P1-8 verifies the identity of the network function NF-2 in a manner similar to that described above with respect to FIG. 1K.

Figure 1L:
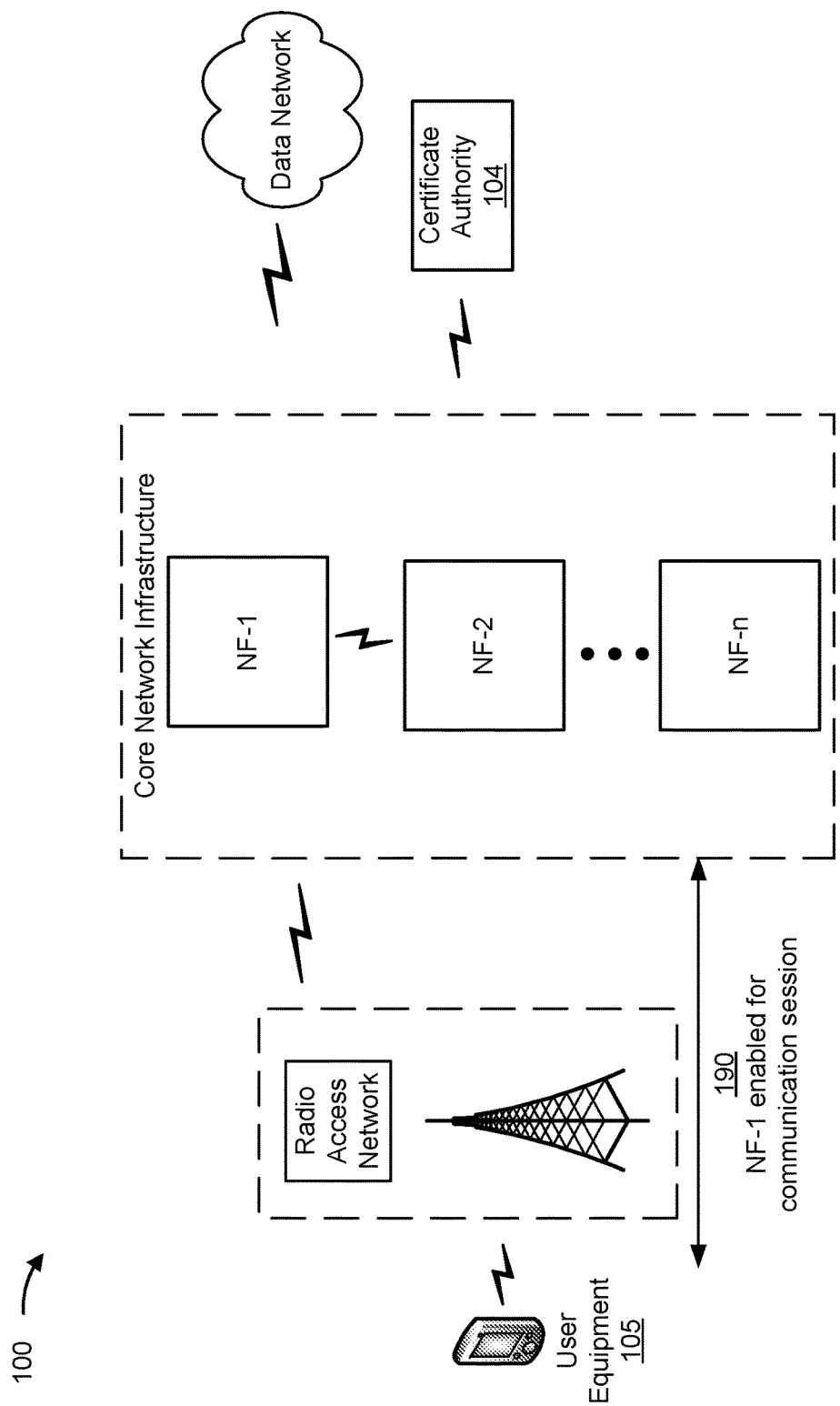

The network function NF-1 may establish the communication session with the UE 105 and/or the network function NF-2 to provide the service to the UE 105 based on receiving the response and/or verifying the identity of the network function NF-2. As shown in FIG. 1L, and by reference number 190, the network function NF-1 is enabled for the communication session with the UE 105 based on establishing the communication session with the network function NF-2.

By utilizing a private PKI to verify an identity of an entity in a network, a network architecture of the network can be quickly and efficiently modified to adapt to a current network condition (e.g., a request from a UE to access a service provided by the network, network congestion, a failure of a network function, a failure of a host device, and/or the like). Further, because the certificates are not stored in a public database, a risk of creating a security vulnerability associated with the network may be decreased, as discussed above.

Further, because the distributed proxy requests and obtains the certificate for the network function and/or a component of the network function, the network function and/or the component of the network function can be configured to include a limited set of protocols (e.g., a set of protocols that does not include a protocol used solely for communicating with a public CA). In this way, fewer computing resources may be utilized to implement the network function relative to a corresponding network function that obtains a certificate from a public CA.

As indicated above, FIGS. 1A-1L are provided as one or more examples. Other examples may differ from what is described with regard to FIGS. 1A-1L. The number and arrangement of devices shown in FIGS. 1A-1L are provided as an example. In practice, there may be additional devices, fewer devices, different devices, or differently arranged than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) shown in FIGS. 1A-1L may perform one or more functions described as being performed by another set of devices shown in FIGS. 1A-1L.

Figure 2:
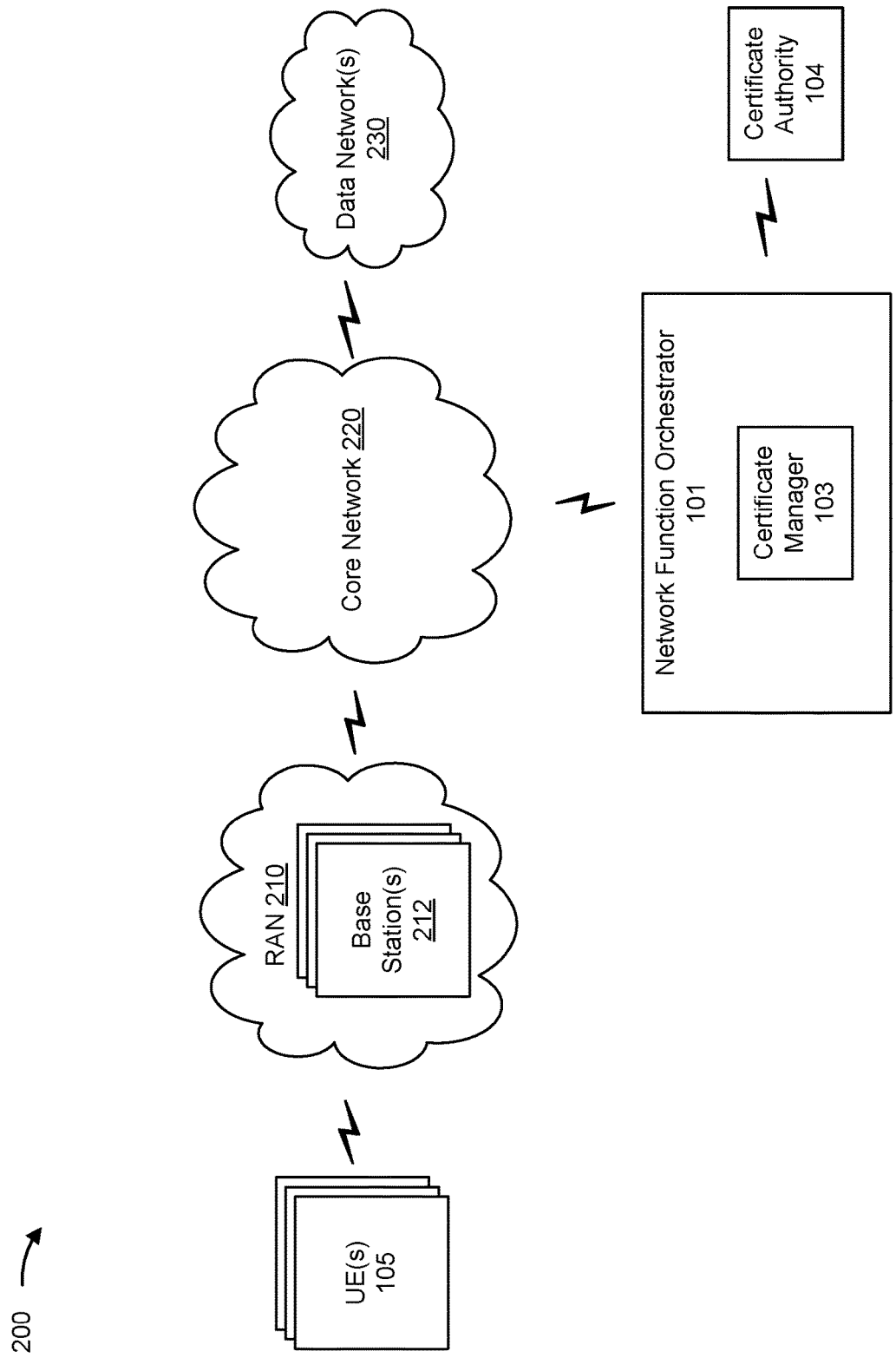
FIG. 2 is a diagram of an example implementation described herein.

FIG. 2 is a diagram of an example environment 200 in which systems and/or methods described herein may be implemented. As shown in FIG. 2, environment 200 may include a network function orchestrator 101, a certificate manager 103, a CA 104, one or more UE(s) 105 (referred to herein individually as UE 105 or collectively as UEs 105), a RAN 210, one or more base stations 212 (referred to herein individually as base station 212 or collectively as base stations 212), a core network 220, and a data network 230. Devices of environment 200 may interconnect via wired connections, wireless connections, or a combination of wired and wireless connections.

Network function orchestrator 101 includes one or more devices, components, or functions (implemented on one or more devices) to perform one or more functions described herein. Network function orchestrator 101 may instantiate network functions, terminate network functions, scale network functions to enable UE 105 to utilize one or more services provided by core network 220, and/or the like.

Certificate manager 103 includes one or more devices for provisioning, managing, and/or providing certificates to entities included in core network 220. Certificate manager 103 may determine that a network function has been instantiated in core network 220, may obtain a certificate for the network function, and may provide the certificate to the network function to enable the network function to communicate with other network functions within core network 220.

CA 104 includes one or more devices, components, or functions (implemented on one or more devices) to generate and provide certificates, as described herein. For example, CA 104 may receive a request for a certificate, verify an identity of an entity for which the certificate is to be generated, and generate the certificate based on verifying the identity of the entity UE 105 includes one or more devices capable of communicating with base station 212 and/or a network (e.g., core network 220, data network 230, and/or the like). For example, UE 105 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 105 may be capable of communicating using uplink (e.g., UE to base station) communications, downlink (e.g., base station to UE) communications, and/or side link (e.g., UE-to-UE) communications. In some implementations, UE 105 may include a machine-type communication (MTC) UE, such as an evolved or enhanced MTC (eMTC) UE. In some implementations, UE 105 may include an IoT UE, such as a narrowband IoT (NB-IoT) UE and/or the like. In some implementations, UE 105 may perform one or more actions described as being performed by the UE of example implementation 100.

RAN 210 can include a base station and be operatively connected, via a wired and/or wireless connection, to the core network 220 through a user plane function (UPF). RAN 210 can facilitate communication sessions between UEs 105 and data network 230 by communicating application-specific data between RAN 210 and core network 220.

Base station 212 includes one or more devices capable of communicating with UE 105 using a cellular Radio Access Technology (RAT). For example, base station 212 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 212 may transfer traffic between UE 105 (e.g., using a cellular RAT), other base stations 212 (e.g., using a wireless interface or a backhaul interface, such as a wired backhaul interface), and/or data network 230. Base station 212 may provide one or more cells that cover geographic areas. Some base stations 212 may be mobile base stations. Some base stations 212 may be capable of communicating using multiple RATs.

In some implementations, base station 212 may perform scheduling and/or resource management for UEs 105 covered by base station 212 (e.g., UEs 105 covered by a cell provided by base station 212). In some implementations, base station 212 may be controlled or coordinated by a network controller, which may perform load balancing, network-level configuration, and/or the like. The network controller may communicate with base station 212 via a wireless or wireline backhaul. In some implementations, base station 212 may include a network controller, a self-organizing network (SON) module or component, or a similar module or component. In other words, base station 212 may perform network control, scheduling, and/or network management functions (e.g., for other base stations 212 and/or for uplink, downlink, and/or side link communications of UEs 105 covered by the base station 212). In some implementations, base station 212 may include a central unit and multiple distributed units. The central unit may coordinate access control and communication with regard to the multiple distributed units. The multiple distributed units may provide UEs 105 and/or other base stations 212 with access to data network 230.

Core network 220 includes various types of core network architectures, such as a 5GC (e.g., core network 300 of FIG. 3), an LTE evolved packet core (EPC), and/or the like. In some implementations, core network 220 may be implemented on physical devices, such as gateways, mobility management entities, and/or the like. In some implementations, the hardware and/or software implementing core network 220 can be virtualized (e.g., through the use of network function virtualization and/or software-defined networking), thereby allowing for the use of composable infrastructure when implementing core network 220. In this way, networking, storage, and compute resources can be allocated to implement the functions of core network 220 in a flexible manner as opposed to relying on dedicated hardware and software to implement these functions. Core network 220 may be managed by network function orchestrator 101.

Data network 230 includes one or more wired and/or wireless data networks. For example, data network 230 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
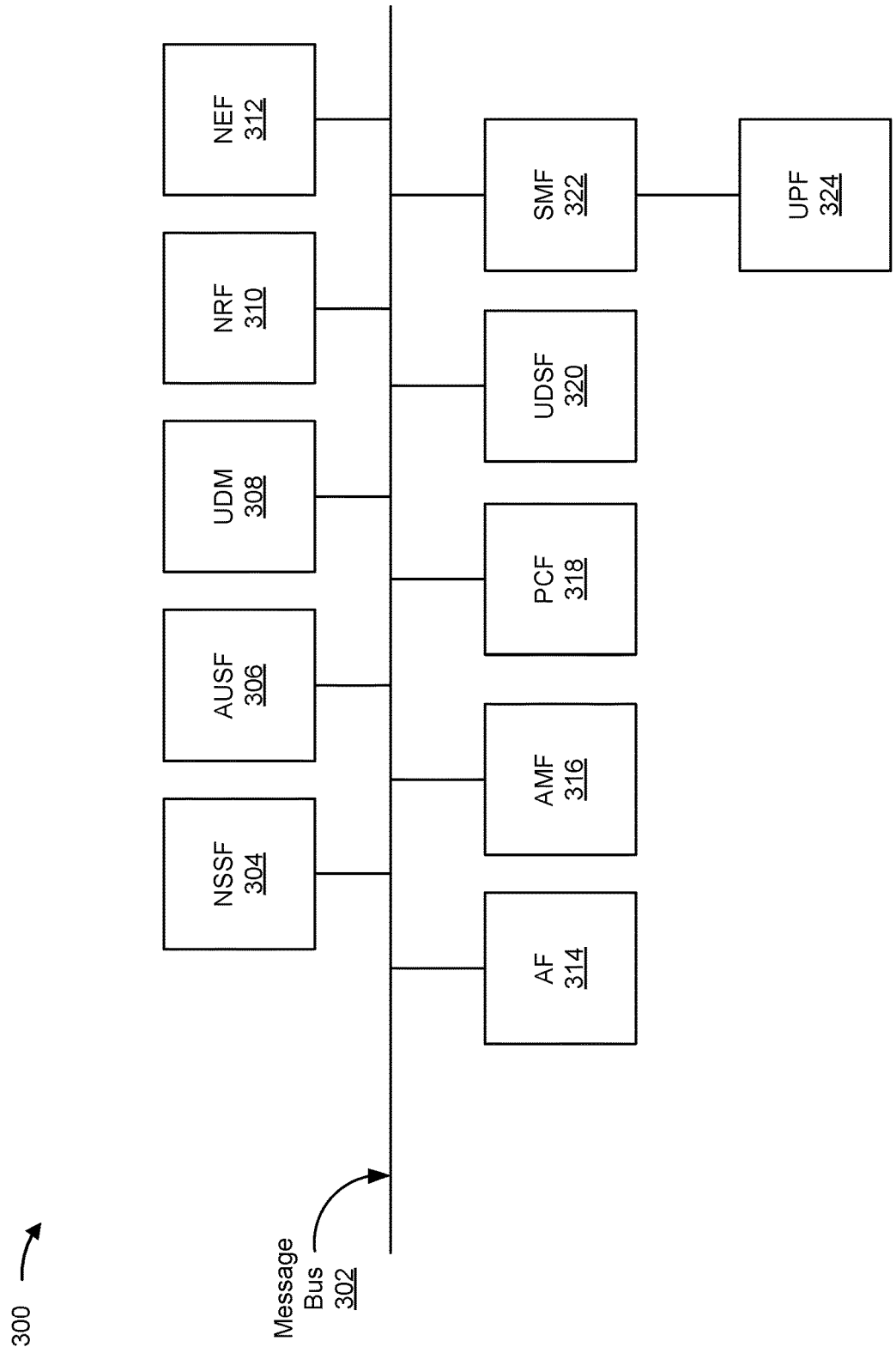
FIG. 3 is a diagram of an example environment in which systems and/or methods described herein may be implemented.

FIG. 3 is a diagram of an example functional architecture of a core network 300 in which systems and/or methods, described herein, can be implemented. As shown in FIG. 3, core network 300 may include a number (or quantity) of functional elements. The functional elements of core network 300 may communicate via a message bus 302. As shown in FIG. 3, the functional elements may include, for example, a network slice selection function (NSSF)) 304, an authentication server function (AUSF) 306, a unified data management (UDM) function 308, a network function repository function (NRF) 310, a network exposure function (NEF) 312, an application function (AF) 314, an access and mobility management function (AMF) 316, a policy control function (PCF) 318, an unstructured data storage function (UDSF) 320, a session management function (SMF) 322, a user plane function (UPF) 324, and/or the like. As shown, these functional elements may be communicatively connected via message bus 302.

Each of the functional elements shown in FIG. 3 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 304 is a hardware-based element that may select network slice instances (NSIs) for UEs (and/or may determine network slice policies to be applied at a RAN). By providing network slicing, NSSF 304 allows an operator to deploy multiple substantially independent end-to-end networks potentially with the same infrastructure. In some implementations, each slice may be customized for different services.

AUSF 306 is a hardware-based element that may act as an authentication server and support the process of authenticating UEs in the wireless telecommunications system. UDM 308 can store subscriber data and profiles in the wireless telecommunications system. UDM 308 can be used for fixed access, mobile access, and/or the like, in core network 300.

NRF 310 is a hardware-based element that may interface with NEF 312 to provide AMF 316 with group messages. NRF 310 may enable the functional elements of core network 300 to discover and communicate with one another via message bus 302. NEF 312 is a hardware-based element that may support the exposure of capabilities and/or events in the wireless telecommunications system to help other entities in the wireless telecommunications system discover network services. For example, NEF 312 may support the exposure of group messages that may be provided via a group messaging service.

AF 314 may be a hardware-based element that may support application influence on traffic routing, access to NEF 312, policy control, and/or the like. In some implementations, AMF 316 may be a hardware-based element that may act as a termination point for Non-Access Stratum (NAS) signaling, mobility management, and/or the like. AMF 316 can provide authentication and authorization of UEs and mobility management (e.g., provisioning UEs to use NSIs associated with SDDs as described herein). PCF 318 can provide a policy framework that incorporates network slicing, roaming, packet processing, mobility management, and/or the like.

UDSF 320 includes one or more data structures configured to store information, mappings, and/or the like associated with the core network 300. For example, UDSF 320 may include one or more tables, mappings, graphs, and/or the like of resources, NSIs, slice deployment descriptions (SDDs), and/or the like.

SMF 322 may be a hardware-based element that may support the establishment, modification, and release of communication sessions in the wireless telecommunications system. For example, SMF 322 may configure traffic steering policies at UPF 324, enforce UE IP address allocation and policies, and/or the like. SMF 322 can support the establishment, modification, and release of communication sessions in the wireless telecommunications system. For example, SMF 322 can configure traffic steering policies at UPF 324, enforce UE IP address allocation and policies, and/or the like. AMF 316 and SMF 322 can act as a termination point for Non-Access Stratum (NAS) signaling, mobility management, and/or the like. SMF 322 can act as a termination point for session management related to NAS. RAN 210 can send information (e.g., the information that identifies the UE) to AMF 316 and/or SMF 322 via PCF 318.

UPF 324 is a hardware-based element that may serve as an anchor point for intra/inter-RAT mobility. UPF 324 may apply rules to packets, such as rules pertaining to packet routing, traffic reporting, handling user plane QoS, and/or the like. Message bus 302 represents a communication structure for communication among the functional elements. In other words, message bus 302 may permit communication between two or more functional elements of core network 300.

The number and arrangement of functional elements shown in FIG. 3 are provided as an example. In practice, there may be additional functional elements, fewer functional elements, different functional elements, or differently arranged functional elements than those shown in FIG. 3. Furthermore, two or more functional elements shown in FIG. 3 may be implemented within a single device, or a single functional element shown in FIG. 3 may be implemented as multiple, distributed devices. Additionally, or alternatively, a set of functional elements (e.g., one or more functional elements) of core network 300 may perform one or more functions described as being performed by another set of functional elements of core network 300.

Figure 4:
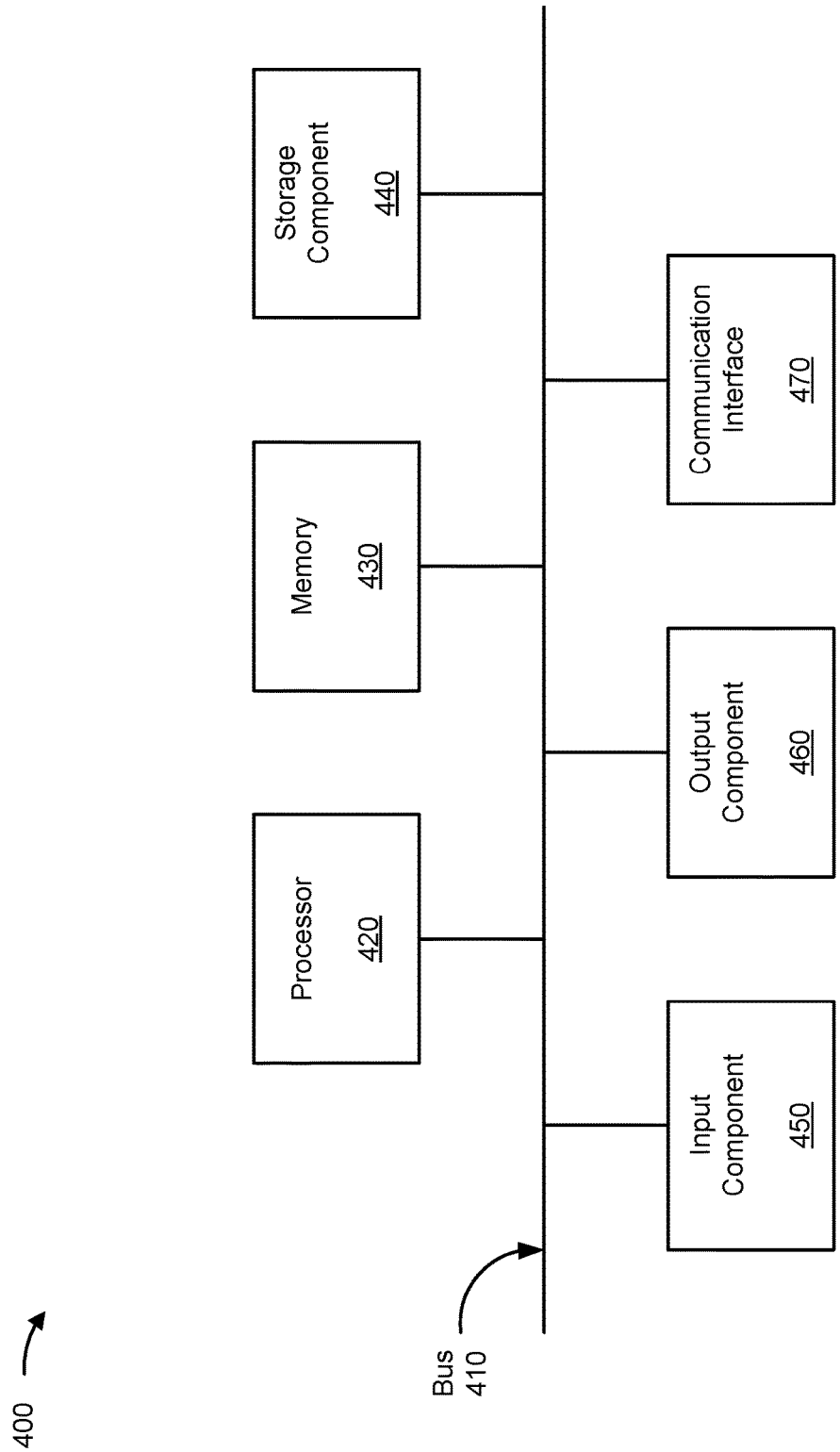
FIG. 4 is a diagram of example components of one or more devices of FIG. 3.

FIG. 4 is a diagram of example components of a device 400. Device 400 may correspond to network function orchestrator 101, certificate manager 103, certificate authority 104, UE 105, base station 212, NSSF 304, AUSF 306, UDM 308, NRF 310, NEF 312, AF 314, AMF 316, PCF 318, UDSF 320, SMF 322, and/or UPF 324. In some implementations, network function orchestrator 101, certificate manager 103, certificate authority 104, UE 105, base station 212, NSSF 304, AUSF 306, UDM 308, NRF 310, NEF 312, AF 314, AMF 316, PCF 318, UDSF 320, SMF 322, and/or UPF 324 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
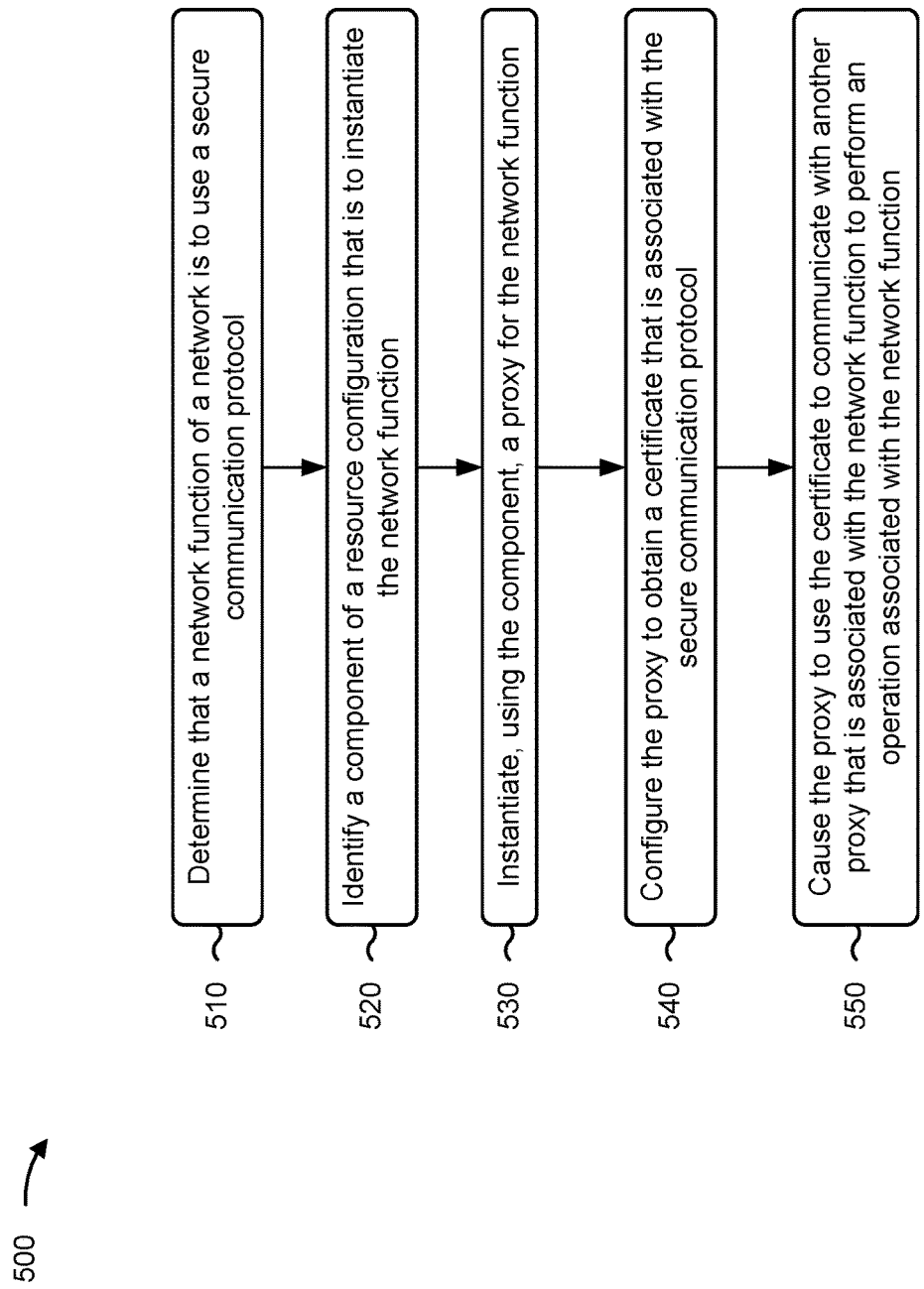
FIG. 5 is a flow chart of an example process relating to configuring a network function proxy for secure communication.

FIG. 5 is a flow chart of an example process 500 associated with systems and methods for managing public key infrastructure certificates for components of a network. In some implementations, one or more process blocks of FIG. 5 may be performed by a device (e.g., certificate manager 103). In some implementations, one or more process blocks of FIG. 5 may be performed by another device or a group of devices separate from or including the device, such as a network function orchestrator (e.g., network function orchestrator 101), a certificate authority (e.g., certificate authority 104), and/or the like. Additionally, or alternatively, one or more process blocks of FIG. 5 may be performed by one or more components of a device 400, such as processor 420, memory 430, storage component 440, input component 450, output component 460, communication interface 470, and/or the like.

As shown in FIG. 5, process 500 may include determining that a network function of a network is to use a secure communication protocol (block 510). For example, the device may determine that a network function of a network is to use a secure communication protocol, as described above. In some implementations, the network function is configured to facilitate communication via the network.

As further shown in FIG. 5, process 500 may include identifying a component of a resource configuration that is to instantiate the network function (block 520). For example, the device may identify a component of a resource configuration that is to instantiate the network function, as described above.

As further shown in FIG. 5, process 500 may include instantiating, using the component, a proxy for the network function (block 530). For example, the device may instantiate, using the component, a proxy for the network function, as described above.

Process 500 may include identifying a set of components of the resource configuration and selecting a component of the set of components to instantiate the proxy.

The resource configuration may include a first virtual resource that is instantiated via a first component and a second virtual resource that is instantiated via a second component. The proxy may be a first proxy that is configured to communicate, using the certificate, with a second proxy, for the second virtual resource, that is instantiated via the second component.

As further shown in FIG. 5, process 500 may include configuring the proxy to obtain a certificate that is associated with the secure communication protocol (block 540). For example, the device may configure the proxy to obtain a certificate that is associated with the secure communication protocol, as described above.

The proxy may be configured to utilize an application programming interface that is associated with a certificate authority that is configured to issue the certificate.

In some implementations, the device, when configuring the proxy, may indicate a certificate authority that is configured to issue the certificate to cause the proxy to obtain the certificate from the certificate authority.

In some implementations, configuring the proxy comprises configuring the proxy to provide the certificate to the other proxy to permit the other proxy to use the secure communication protocol to perform the operation.

In some implementations, configuring the proxy comprises designating the proxy as a signing agent to cause the proxy to use the certificate in association with a communication with another network function and/or another proxy associated with the resource configuration.

In some implementations, configuring the proxy comprises configuring the proxy to utilize an application programming interface that is associated with a certificate authority that is configured to issue the certificate.

In some implementations, configuring the proxy comprises configuring the proxy to renew the certificate after an expiration of the certificate to permit the network function to continue to operate beyond the expiration.

As further shown in FIG. 5, process 500 may include causing the proxy to use the certificate to communicate with another proxy that is associated with the network function to perform an operation associated with the network function (block 550). For example, the device may cause the proxy to use the certificate to communicate with another proxy that is associated with the network function to perform an operation associated with the network function, as described above.

In some implementations, the other proxy is instantiated via a second component that is separate from the first component.

In some implementations, a communication, that is between the proxy and the other proxy and utilizes the secure communication protocol, involves a mutual transport layer security authentication between the proxy and the other proxy.

In some implementations, the resource configuration includes a plurality of virtual resources that are instantiated via a plurality of separate components. The proxy may be configured to distribute certificates to individual proxies of the plurality of virtual resources to permit the plurality of virtual resources to use the secure communication protocol to instantiate the network function.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   instantiating, by a device, a virtual network function for a communication session with a user equipment (UE);
   instantiating, by the device, a distributed proxy associated with the virtual network function;
   receiving, by the device, a certificate signing request from the distributed proxy;
   obtaining, by the device and from a certificate authority of a public key infrastructure, a certificate for the distributed proxy based on the certificate signing request;
   generating, by the device, a certificate profile for the distributed proxy based on obtaining the certificate;
   providing, by the device, the certificate profile to the distributed proxy to enable the virtual network function to utilize the certificate to communicate with the UE via the communication session; and
   authenticating the virtual network function based on receiving the certificate signing request from the distributed proxy.

2. The method of claim 1, wherein authenticating the virtual network function comprises:
   determining that the virtual network function is instantiated by the device; and
   authenticating the virtual network function based on the virtual network function being instantiated by the device.

3. The method of claim 1, wherein authenticating the virtual network function comprises:
   determining that the distributed proxy is associated with the virtual network function; and
   authenticating the virtual network function based on the distributed proxy being associated with the virtual network function.

4. The method of claim 1, further comprising:
   determining that a quantity of communication sessions associated with a network satisfies a threshold quantity of communication sessions.

5. The method of claim 4, wherein the virtual network function is instantiated based on the quantity of communication sessions associated with the network satisfying the threshold quantity of communication sessions.

6. The method of claim 1, wherein the distributed proxy includes a master proxy and a plurality of proxies associated with respective components of the virtual network function, and wherein the master proxy utilizes the certificate to securely communicate data between components of the virtual network function via the plurality of proxies.

7. The method of claim 1, wherein the distributed proxy includes a master proxy and a plurality of proxies associated with respective components of the virtual network function, and wherein the master proxy utilizes the certificate to issue certificates to the plurality of proxies to enable a secure communication of data between the respective components of the virtual network function via the plurality of proxies.

8. A non-transitory computer-readable medium storing a set of instructions, the set of instructions comprising:
   one or more instructions that, when executed by one or more processors of a device, cause the device to:
     instantiate a virtual network function for a communication session with a user equipment (UE);
     instantiate a distributed proxy associated with the virtual network function;
     receive a certificate signing request from the distributed proxy;
     obtain, from a certificate authority of a public key infrastructure, a certificate for the distributed proxy based on the certificate signing request;

generate a certificate profile for the distributed proxy based on obtaining the certificate;

provide the certificate profile to the distributed proxy to enable the virtual network function to utilize the certificate to communicate with the UE via the communication session; and authenticate the virtual network function based on receiving the certificate signing request from the distributed proxy.

9. The non-transitory computer-readable medium of claim 8, wherein the one or more instructions, that cause the device to authenticate the virtual network function, cause the device to:

determine that the virtual network function is instantiated by the device; and authenticate the virtual network function based on the virtual network function being instantiated by the device.

10. The non-transitory computer-readable medium of claim 8, wherein the one or more instructions, that cause the device to authenticate the virtual network function, cause the device to:

determine that the distributed proxy is associated with the virtual network function; and authenticate the virtual network function based on the distributed proxy being associated with the virtual network function.

11. The non-transitory computer-readable medium of claim 8, wherein the one or more instructions further cause the device to:

determine that a quantity of communication sessions associated with a network satisfies a threshold quantity of communication sessions.

12. The non-transitory computer-readable medium of claim 11, wherein the virtual network function is instantiated based on the quantity of communication sessions associated with the network satisfying the threshold quantity of communication sessions.

13. The non-transitory computer-readable medium of claim 8, wherein the distributed proxy includes a master proxy and a plurality of proxies associated with respective components of the virtual network function, and wherein the master proxy utilizes the certificate to securely communicate data between components of the virtual network function via the plurality of proxies.

14. The non-transitory computer-readable medium of claim 8, wherein the distributed proxy includes a master proxy and a plurality of proxies associated with respective components of the virtual network function, and wherein the master proxy utilizes the certificate to issue certificates to the plurality of proxies to enable a secure communication of data between the respective components of the virtual network function via the plurality of proxies.

15. A device, comprising:
one or more hardware processors configured to:
instantiate a virtual network function for a communication session with a user equipment (UE);
instantiate a distributed proxy associated with the virtual network function;
receive a certificate signing request from the distributed proxy;
obtain, from a certificate authority of a public key infrastructure, a certificate for the distributed proxy based on the certificate signing request;
generate a certificate profile for the distributed proxy based on obtaining the certificate;
provide the certificate profile to the distributed proxy to enable the virtual network function to utilize the certificate to communicate with the UE via the communication session; and
authenticate the virtual network function based on receiving the certificate signing request from the distributed proxy.

16. The device of claim 15, wherein the one or more processors, to authenticate the virtual network function, are configured to:

determine that the virtual network function is instantiated by the device; and authenticate the virtual network function based on one or more of:

the virtual network function being instantiated by the device, or the distributed proxy being associated with the virtual network function.

17. The device of claim 15, wherein the one or more processors are further configured to:

determine that a quantity of communication sessions associated with a network satisfies a threshold quantity of communication sessions.

18. The device of claim 7, wherein the virtual network function is instantiated based on the quantity of communication sessions associated with the network satisfying the threshold quantity of communication sessions.

19. The device of claim 15, wherein the distributed proxy includes a master proxy and a plurality of proxies associated with respective components of the virtual network function, and wherein the master proxy utilizes the certificate to securely communicate data between components of the virtual network function via the plurality of proxies.

20. The device of claim 15, wherein the distributed proxy includes a master proxy and a plurality of proxies associated with respective components of the virtual network function, and wherein the master proxy utilizes the certificate to issue certificates to the plurality of proxies to enable a secure communication of data between the respective components of the virtual network function via the plurality of proxies.

* * * * *